US011186373B1

(12) United States Patent
Elliott et al.

(10) Patent No.: US 11,186,373 B1
(45) Date of Patent: Nov. 30, 2021

(54) SYSTEM INCLUDING RESETTABLE CUPHOLDER APPARATUS

(71) Applicant: B/E AEROSPACE, INC., Winston-Salem, NC (US)

(72) Inventors: Mark Andrew Elliott, Winston-Salem, NC (US); Dustin Shaw, Winston-Salem, NC (US); Arnold Wickham, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/925,159

(22) Filed: Jul. 9, 2020

(51) Int. Cl.
*B64D 11/06* (2006.01)
*B60N 3/10* (2006.01)

(52) U.S. Cl.
CPC .......... *B64D 11/0638* (2014.12); *B60N 3/102* (2013.01)

(58) Field of Classification Search
CPC ..... A47B 31/06; A47B 13/16; B64D 11/0638; B60N 3/102; B60N 3/004; B60N 3/001
USPC .............................................. 108/44, 16, 25
See application file for complete search history.

(56) References Cited

U.S. PATENT DOCUMENTS

| | | | | |
|---|---|---|---|---|
| 2,574,250 A | * | 11/1951 | Dalton | B60N 3/102 16/329 |
| 3,503,648 A | * | 3/1970 | James | B60R 7/06 296/37.12 |
| 4,756,572 A | * | 7/1988 | Dykstra | B60N 3/102 297/145 |
| D335,177 S | | 4/1993 | Jones et al. | |
| 5,248,183 A | * | 9/1993 | Gignac | B60N 2/793 297/188.16 |
| 5,395,084 A | * | 3/1995 | Ikuma | B60N 3/102 224/483 |
| 5,516,016 A | * | 5/1996 | Anderson | B60N 3/108 224/282 |
| 5,628,486 A | * | 5/1997 | Rossman | B60N 3/107 248/311.2 |
| 5,692,718 A | * | 12/1997 | Bieck | B60N 3/102 248/311.2 |
| 5,890,692 A | * | 4/1999 | Lee | B60N 3/108 248/311.2 |

(Continued)

FOREIGN PATENT DOCUMENTS

| | | |
|---|---|---|
| CN | 202820762 U | 3/2013 |
| CN | 104875658 A | 9/2015 |

(Continued)

*Primary Examiner* — Jose V Chen
(74) *Attorney, Agent, or Firm* — Suiter Swantz pc llo

(57) ABSTRACT

A system may include a resettable cupholder apparatus. The resettable cupholder apparatus may include a cupholder member and a cantilever spring. The cupholder member may have a cup hole and may include a cupholder member pivot portion having a stowed detent, a deployed detent, and a bearing face positioned between the stowed detent and the deployed detent. The cantilever spring may have a spring bearing face, and the cantilever spring may apply a force to the cupholder member pivot portion. The resettable cupholder apparatus may be in a stowed position when the spring bearing face is located in the stowed detent. The resettable cupholder apparatus may be in a deployed position when the spring bearing face is located in the deployed detent.

15 Claims, 30 Drawing Sheets

(56) References Cited

U.S. PATENT DOCUMENTS

| | | | | |
|---|---|---|---|---|
| 5,899,426 A * | 5/1999 | Gross | ............... | B60N 3/102 |
| | | | | 248/311.2 |
| 6,105,917 A * | 8/2000 | Yabuya | ............... | B60N 3/102 |
| | | | | 224/281 |
| 6,227,511 B1 | 5/2001 | De Costa | | |
| 6,513,687 B1 | 2/2003 | Siniarski | | |
| 6,685,152 B2 * | 2/2004 | Shirase | ............... | B60N 3/102 |
| | | | | 224/926 |
| D496,197 S | 9/2004 | Wenzler | | |
| 7,568,749 B2 | 8/2009 | Biggs et al. | | |
| 9,809,141 B2 * | 11/2017 | Jain | ............... | B60N 3/108 |
| 10,973,314 B2 * | 4/2021 | Paindavoine | ............... | B60N 3/002 |
| 10,981,654 B2 * | 4/2021 | Slack, Jr. | ............... | B60N 3/103 |
| 2002/0050501 A1 * | 5/2002 | Shimajiri | ............... | B60N 3/102 |
| | | | | 224/282 |
| 2004/0016859 A1 * | 1/2004 | Nishizawa | ............... | B60N 3/106 |
| | | | | 248/311.2 |
| 2004/0130174 A1 * | 7/2004 | Laskey | ............... | B60R 7/04 |
| | | | | 296/37.1 |
| 2015/0274300 A1 * | 10/2015 | Moore | ............... | A47G 23/0225 |
| | | | | 224/401 |
| 2019/0217761 A1 * | 7/2019 | Boddenberg | ............... | B60N 3/102 |

FOREIGN PATENT DOCUMENTS

| | | | | |
|---|---|---|---|---|
| DE | 19653715 C2 | 1/2000 | | |
| KR | 19980013622 U | 6/1998 | | |
| KR | 19980022443 U | 7/1998 | | |
| KR | 19980035313 U | 9/1998 | | |
| KR | 19980041348 U | 9/1998 | | |
| KR | 19980043668 U | 9/1998 | | |
| KR | 19980046770 U | 9/1998 | | |
| KR | 19980048525 U | 9/1998 | | |
| KR | 0132834 Y1 | 12/1998 | | |
| KR | 20040066582 A | 7/2004 | | |
| KR | 20040074207 A | 8/2004 | | |
| KR | 200392941 Y1 | 8/2005 | | |
| KR | 20100007627 U | 7/2010 | | |
| KR | 101667018 B1 | 10/2016 | | |
| WO | WO-2010103980 A1 * | 9/2010 | ............... | B60R 7/06 |
| WO | WO-2015146352 A1 * | 10/2015 | ............... | B60N 3/102 |
| WO | WO-2018221736 A1 * | 12/2018 | ............... | B60R 11/00 |

\* cited by examiner

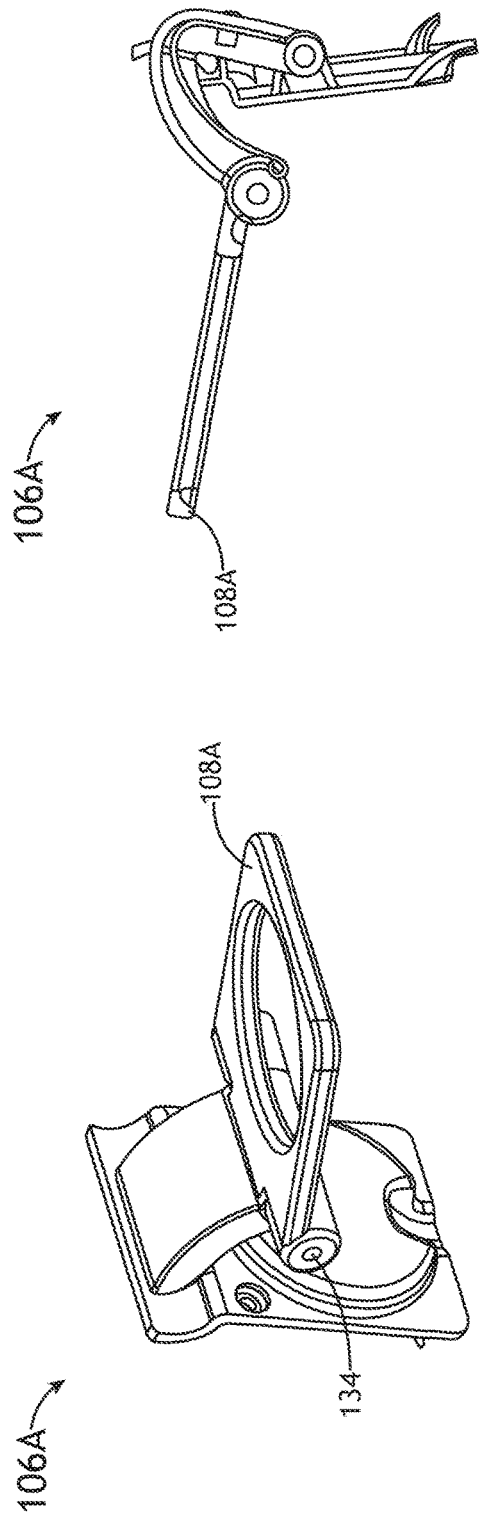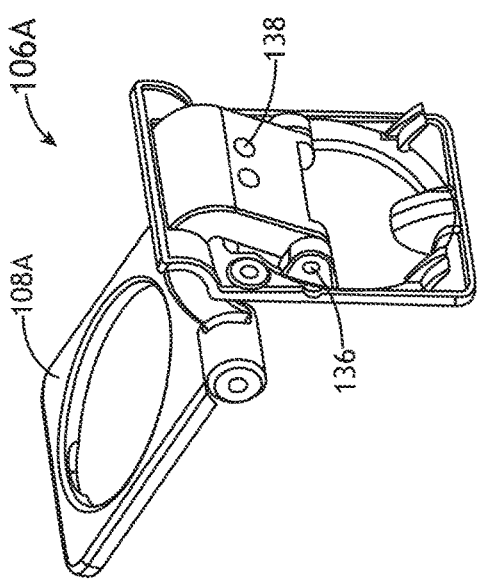
FIG. 14
FIG. 15
FIG. 16

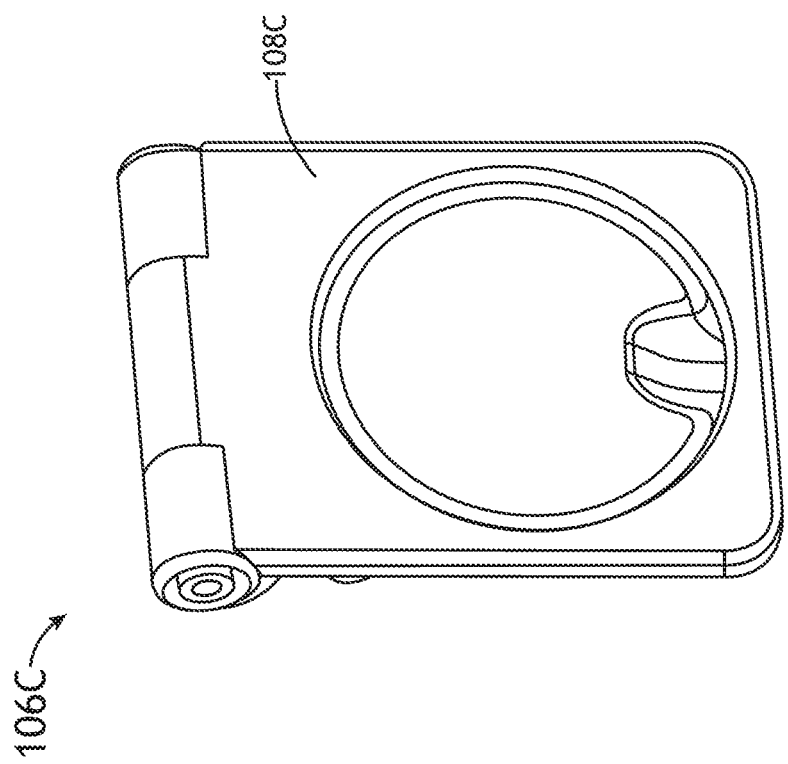

SYSTEM INCLUDING RESETTABLE CUPHOLDER APPARATUS

BACKGROUND

Currently, cupholders on aircraft passenger seats are susceptible to accidental breakage. Additionally, high forces during head injury criterion (HIC) strikes can cause bottom-hinged cupholders to deploy into a path of the strike and break off. Additionally, the cupholders can be become loose or lose an ability to stow over time if interference stow geometry has worn away. Often, the cupholder may not hold the cup far enough away from the bezel, and limited space for mounting of cupholders can restrict the distance the cup is held away from the mounting area such that part of the cup may interfere with the mounting area.

SUMMARY

In one aspect, embodiments of the inventive concepts disclosed herein are directed to a system. The system may include a resettable cupholder apparatus. The resettable cupholder apparatus may include a cupholder member and a cantilever spring. The cupholder member may have a cup hole and may include a cupholder member pivot portion having a stowed detent, a deployed detent, and a bearing face positioned between the stowed detent and the deployed detent. The cantilever spring may have a spring bearing face, and the cantilever spring may apply a force to the cupholder member pivot portion. The resettable cupholder apparatus may be in a stowed position when the spring bearing face is located in the stowed detent. The resettable cupholder apparatus may be in a deployed position when the spring bearing face is located in the deployed detent.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIGS. 11, 12, 13, 14, 15, 16, 17, 18, 19, 20, 21, 22, 23, 24, 25, 26, and 27 are views of the top-hinged resettable cupholder apparatus of FIG. 3 according to the inventive concepts disclosed herein.

FIGS. 28, 29, 30, and 31 are views of an exemplary embodiment of a top-hinged resettable cupholder apparatus according to the inventive concepts disclosed herein.

DETAILED DESCRIPTION

Figure 1:
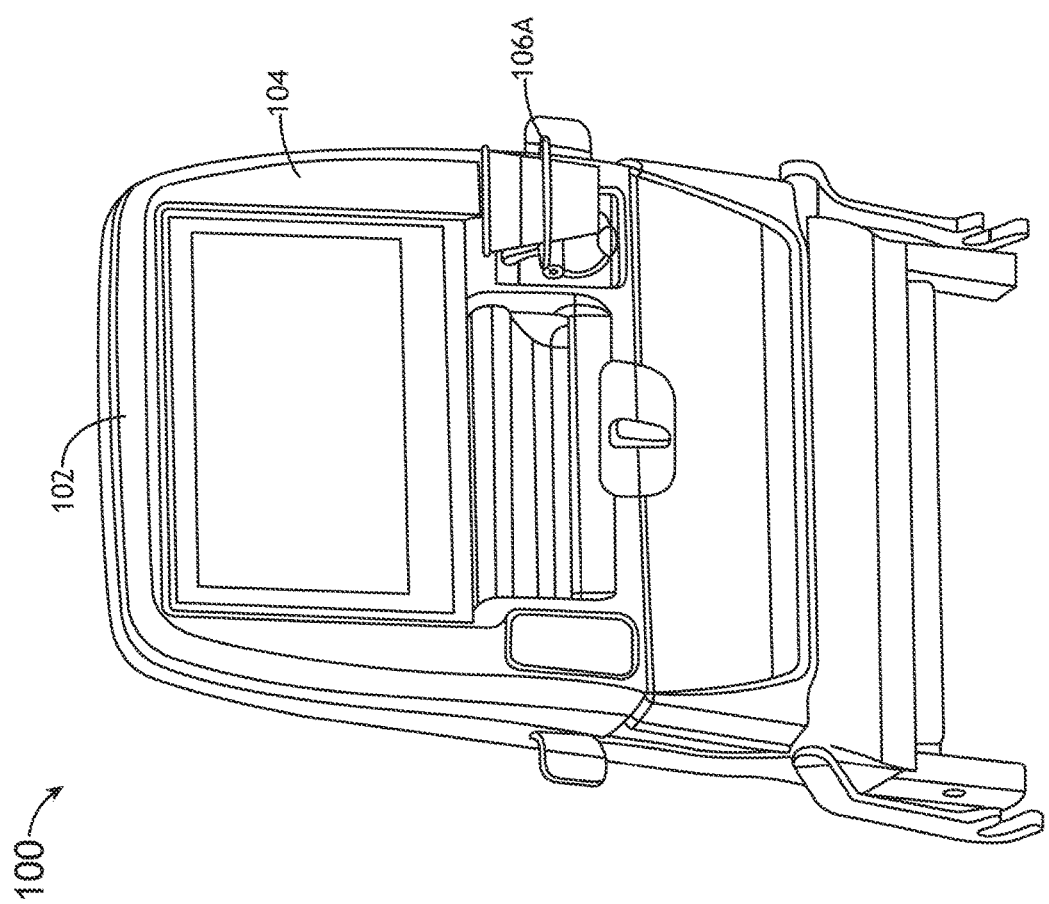
FIG. 1 is a view of an exemplary embodiment of a system including a seat having a top-hinged resettable cupholder apparatus according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a,* 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system including a resettable cupholder apparatus. The system may be a non-vehicular system or may include a vehicle (e.g., aircraft, watercraft, automobile, train, etc.). The resettable cupholder apparatus may be used in any suitable environment.

In some embodiments, resettable cupholder apparatus may be designed to break over and be reset instead of breaking. For example, the resettable cupholder apparatus may utilize a top pivot which self-closes and remains closed when subjected to a downward force or a bottom pivot which self-closes and remains closed when subjected to an upward force. The resettable cupholder apparatus may maintain its stowed and closed positions by way of cantilever spring and detent geometry. The spring may be designed to limit wear and maintain longevity of the product. Spring and detent geometry can be tuned to break over at a desired force. For areas with limited installation space, the cupholder can extend out and away from a stowed position to place the cup in a position conducive to usage.

In some embodiments, the pivot hinge geometry may enable the resettable cupholder apparatus to break over and be reset rather than breaking off. The geometry can be fine-tuned to break over at a specific desired force. For example, when utilizing a top-hinged design, the resettable cupholder apparatus may close or remain closed under downward loads. In some embodiments, because a pretensioned spring deflects out of the way, the resettable cupholder apparatus may not become loose over time due to wear. To accommodate limited space, the resettable cupholder apparatus can be designed to extend out and away from an attachment point.

In some embodiments, a break over feature of the resettable cupholder apparatus may help prevent accidental breakage of the resettable cupholder apparatus and/or surrounding components. The resettable cupholder apparatus can utilize a top hinge or a bottom hinge. A spring (e.g., a cantilever spring) may limit wear and maintain longevity of the product while ensuring the resettable cupholder apparatus can remain tightly stowed over time. The spring can be used to self-close and self-deploy as action is initiated. In some embodiments, a top-hinged resettable cupholder apparatus can prevent the resettable cupholder apparatus from deploying into a HIC path. Additionally, in some embodiments, for areas with limited installation space, a top-hinged resettable cupholder apparatus can extend out and away from a mount member to a place a cup in a position without the cup interfering with the mount member.

Figure 2:
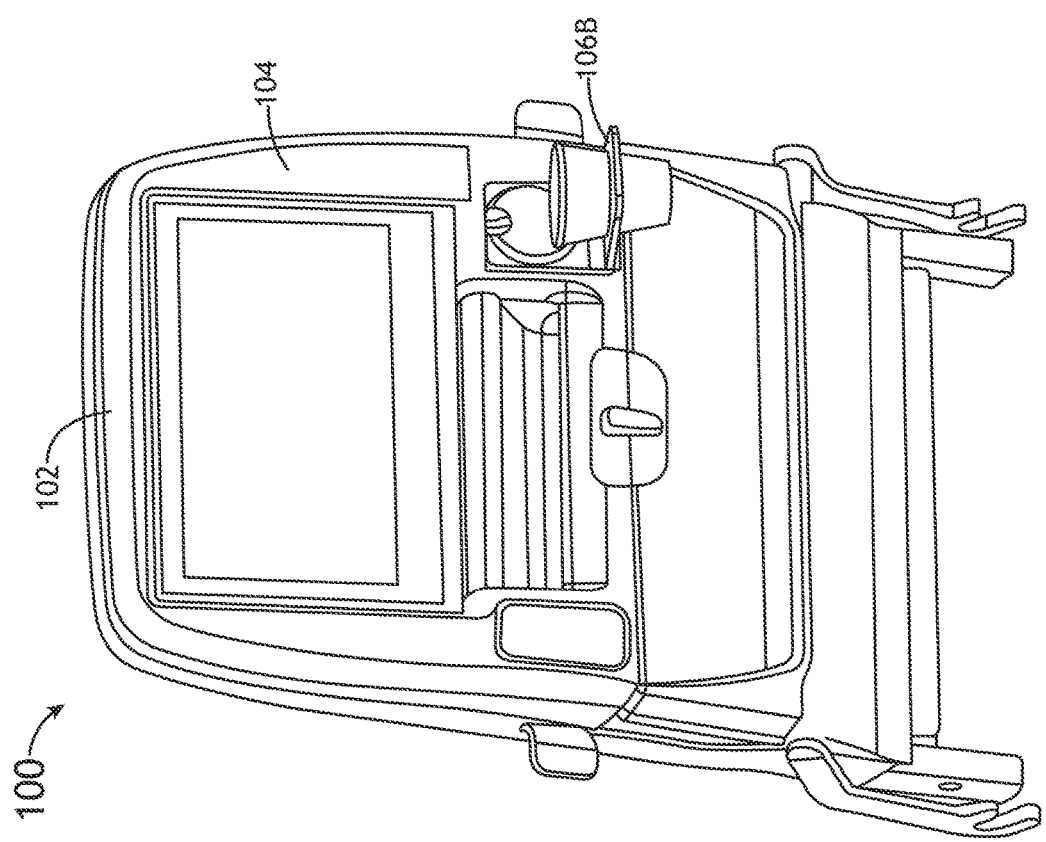
FIG. 2 is a view of an exemplary embodiment of a system including a seat having a bottom-hinged resettable cupholder apparatus according to the inventive concepts disclosed herein.

Referring now to FIGS. 1-2, exemplary embodiments of a system including a vehicle (e.g., aircraft 100, watercraft, automobile, train, etc.) including at least one seat 102 (e.g., an aircraft seat) are depicted according to the inventive concepts. For example, the seat 102 may have a back 104. The system may include at least one resettable cupholder apparatus (e.g., a top-hinged resettable cupholder apparatus (e.g., 106A, as shown in FIG. 1) or a bottom-hinged resettable cupholder apparatus (e.g., 106B, as shown in FIG. 2)), which, for example, may be mounted to the back 104 of the seat 102 or a monument. The resettable cupholder apparatus may be mounted at any suitable location in any suitable vehicle, or in any other suitable environment. In some embodiments, the system may include multiple resettable cupholder apparati (e.g., at least one 106A, at least one 106B, at least one 106C, and/or at least one 106D).

Figure 3:
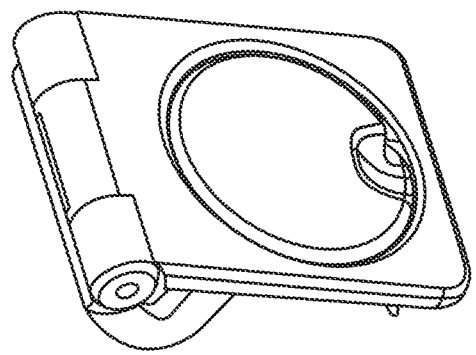
FIG. 3 is a view of an exemplary embodiment of a top-hinged resettable cupholder apparatus according to the inventive concepts disclosed herein.

Referring now to FIG. 3, an exemplary embodiment of the top-hinged resettable cupholder apparatus 106A is shown in a stowed position.

Figure 4:
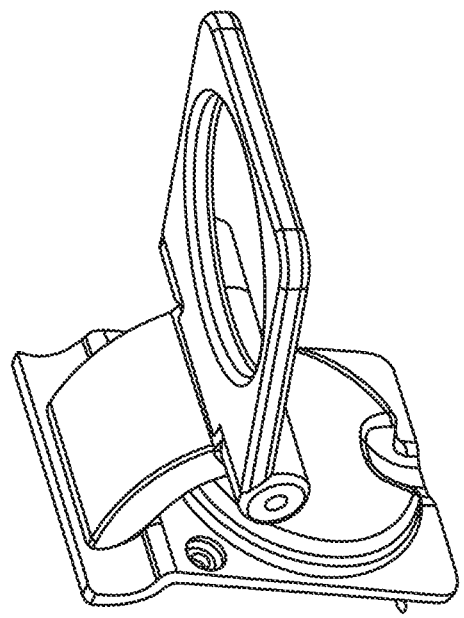
FIG. 4 is a view of the top-hinged resettable cupholder apparatus of FIG. 3 according to the inventive concepts disclosed herein.

Referring now to FIG. 4, the top-hinged resettable cupholder apparatus 106A of FIG. 3 is shown in a deployed position.

Figure 5:
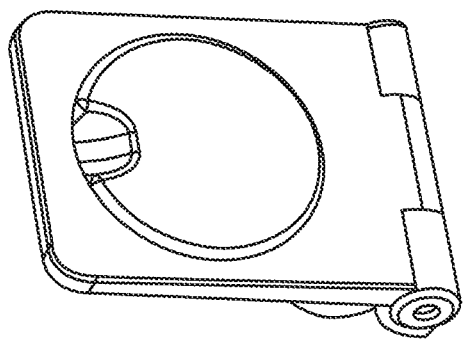
FIG. 5 is a view of an exemplary embodiment of a bottom-hinged resettable cupholder apparatus according to the inventive concepts disclosed herein.

Referring now to FIG. 5, an exemplary embodiment of the bottom-hinged resettable cupholder apparatus 106B is shown in a stowed position.

Figure 6:
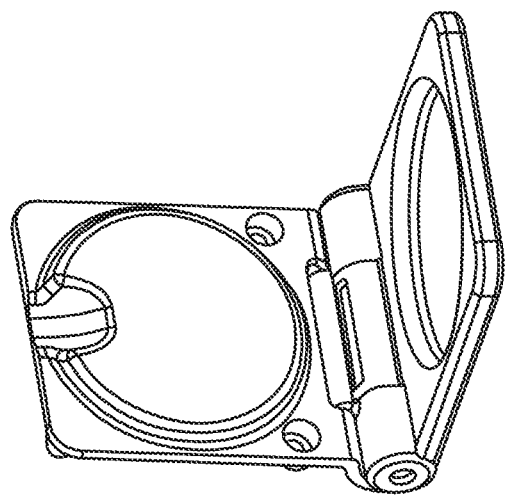
FIG. 6 is a view of the bottom-hinged resettable cupholder apparatus of FIG. 5 according to the inventive concepts disclosed herein.

Referring now to FIG. 6, the bottom-hinged resettable cupholder apparatus 106B of FIG. 5 is shown in a deployed position.

Still referring to FIGS. 3-6, exemplary embodiments of the resettable cupholder apparatus (e.g., 106A, or 106B) may be configured to break over and be reset instead of breaking. The stowed and deployed positions may be maintained by a cantilever spring matched with a detent geometry of the resettable cupholder apparatus. The cantilever spring design may limit wear on and extend longevity of the resettable cupholder apparatus. The cantilever spring and detent geometry can be tuned to break over at a specific desired force. For example, for areas with limited installation space, the top-hinged resettable cupholder apparatus 106A can extend out and away from its stowed position to place a cup in a position conducive to usage so that cup does not interfere with the top-hinged resettable cupholder apparatus 106A mounting location.

Figure 7:
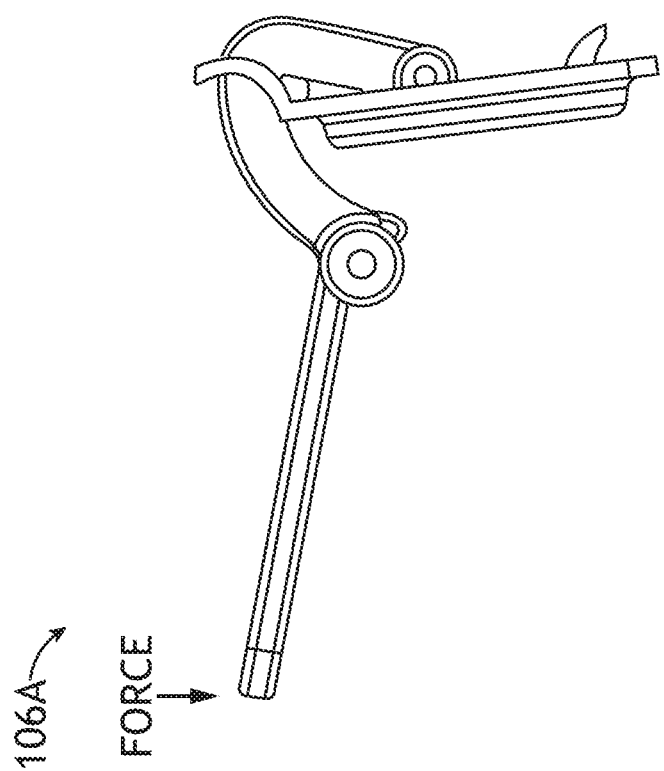
FIG. 7 is a view of the top-hinged resettable cupholder apparatus of FIG. 3 according to the inventive concepts disclosed herein.

Referring now to FIG. 7, the top-hinged resettable cupholder apparatus 106A of FIG. 3 is shown in a deployed position.

Figure 8:
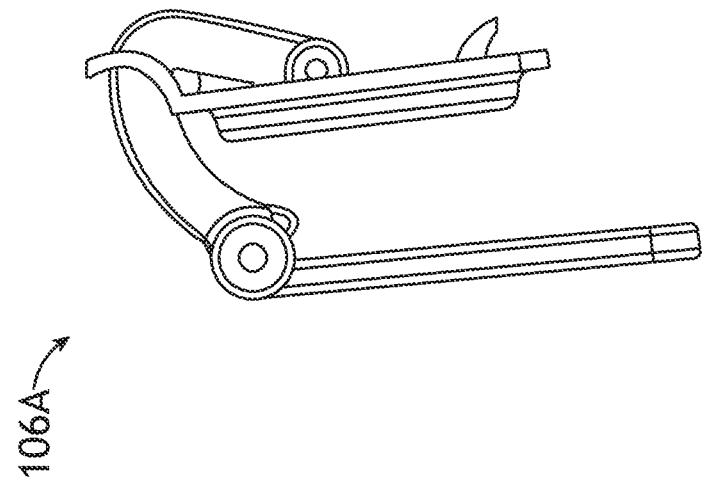
FIG. 8 is a view of the top-hinged resettable cupholder apparatus of FIG. 3 according to the inventive concepts disclosed herein.

Referring now to FIG. 8, the top-hinged resettable cupholder apparatus 106A of FIG. 3 is shown in a broken over state.

Figure 9:
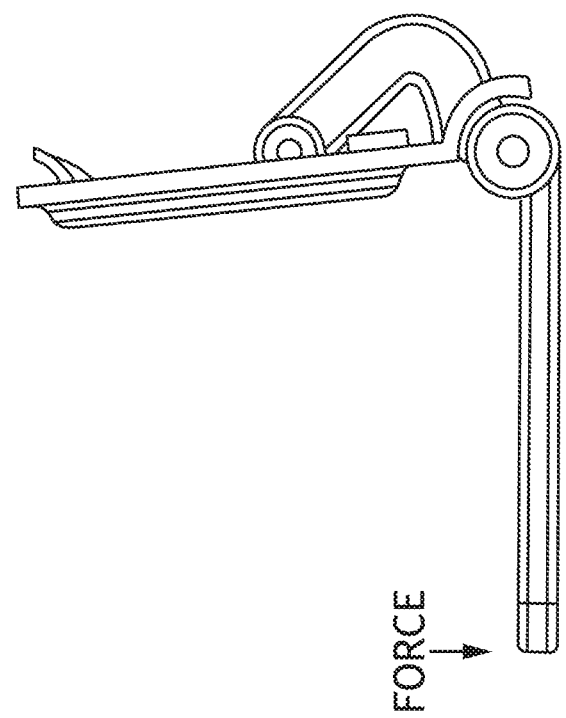
FIG. 9 is a view of the bottom-hinged resettable cupholder apparatus of FIG. 5 according to the inventive concepts disclosed herein.

Referring now to FIG. 9, the bottom-hinged resettable cupholder apparatus 106B of FIG. 5 is shown in a deployed position.

Figure 10:
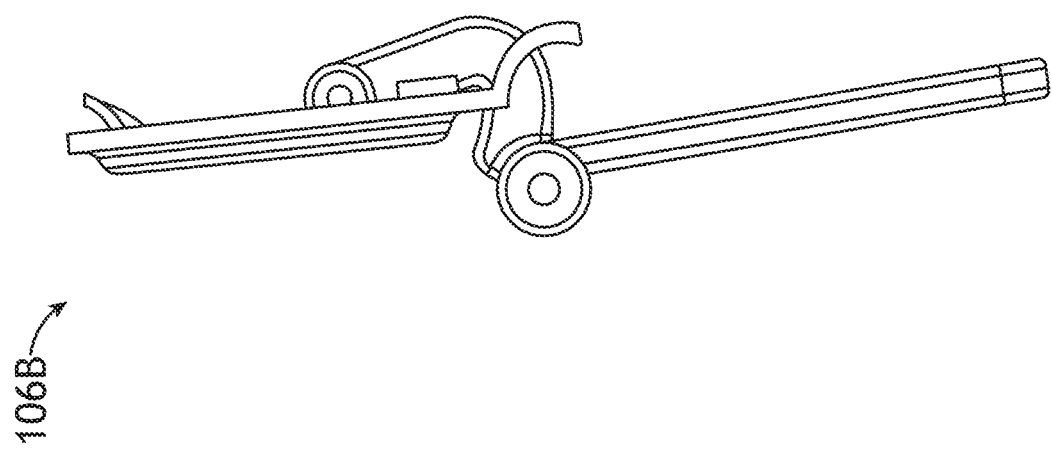
FIG. 10 is a view of the bottom-hinged resettable cupholder apparatus of FIG. 5 according to the inventive concepts disclosed herein.

Referring now to FIG. 10, the bottom-hinged resettable cupholder apparatus 106B of FIG. 5 is shown in a broken over state.

Still referring to FIGS. 7-10, when subject to a force equal to or greater than a threshold force, exemplary embodiments of the resettable cupholder apparatus (e.g., 106A, or 106B) may be configured to break over and out of the way while preserving the integrity of the resettable cupholder apparatus and without causing damage to the resettable cupholder apparatus. After a break over, the resettable cupholder apparatus can be reset and used again.

Referring now to FIGS. 11-27, views of the exemplary embodiment of the top-hinged resettable cupholder apparatus 106A of FIG. 3 are shown. A cupholder member pivot portion 118A of the top-hinged resettable cupholder apparatus 106A may be configured to extend away from the mount member 120A as the resettable cupholder apparatus 106A moves from the stowed position toward the deployed position.

Figure 11:
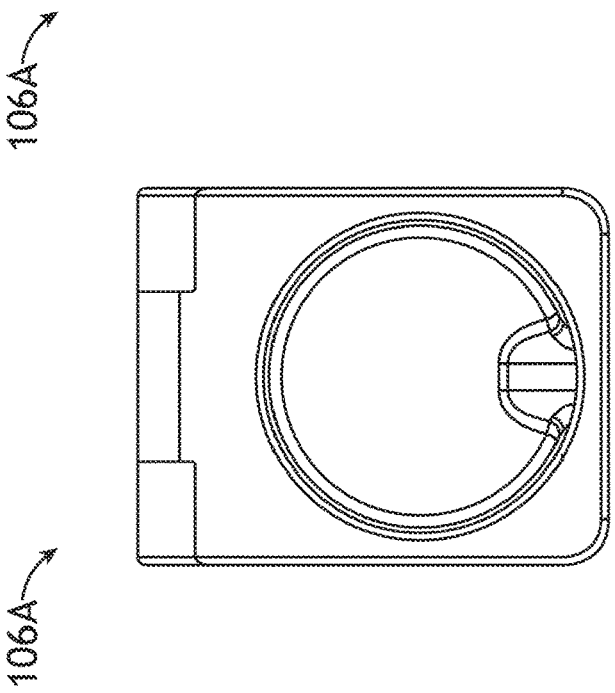

Referring now to FIG. 11, a front view of the top-hinged resettable cupholder apparatus 106A of FIG. 3 is shown in a stowed position.

Figure 12:
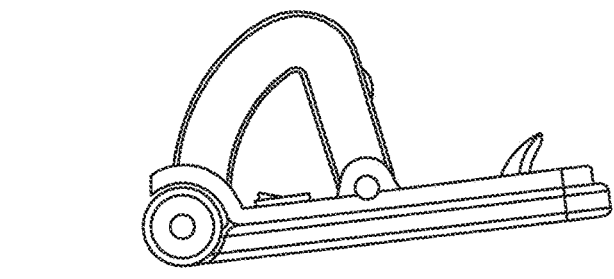

Referring now to FIG. 12, a side view of the top-hinged resettable cupholder apparatus 106A of FIG. 3 is shown in a stowed position.

Figure 13:
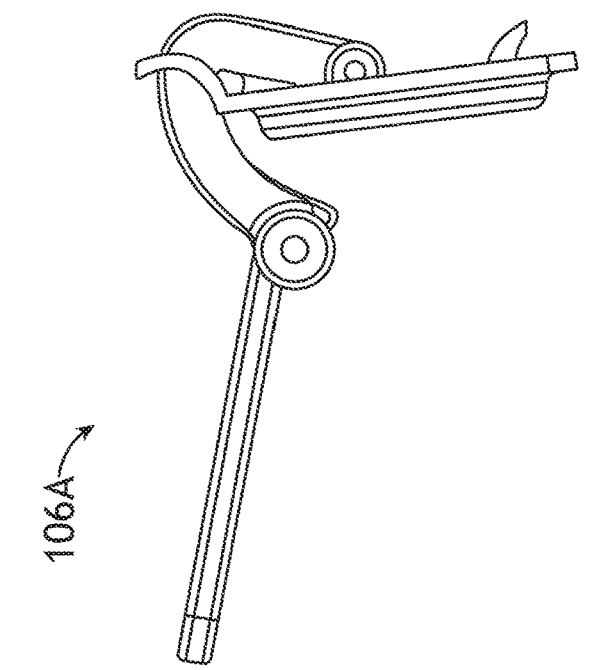

Referring now to FIG. 13, a side view of the top-hinged resettable cupholder apparatus 106A of FIG. 3 is shown in a deployed position.

Referring now to FIGS. 11-27, views of the exemplary embodiment of the top-hinged resettable cupholder apparatus 106A of FIG. 3 depicting various components are shown.

Referring now to FIGS. 14-16, various views of the top-hinged resettable cupholder apparatus 106A of FIG. 3 are shown in a deployed position.

Figure 17:
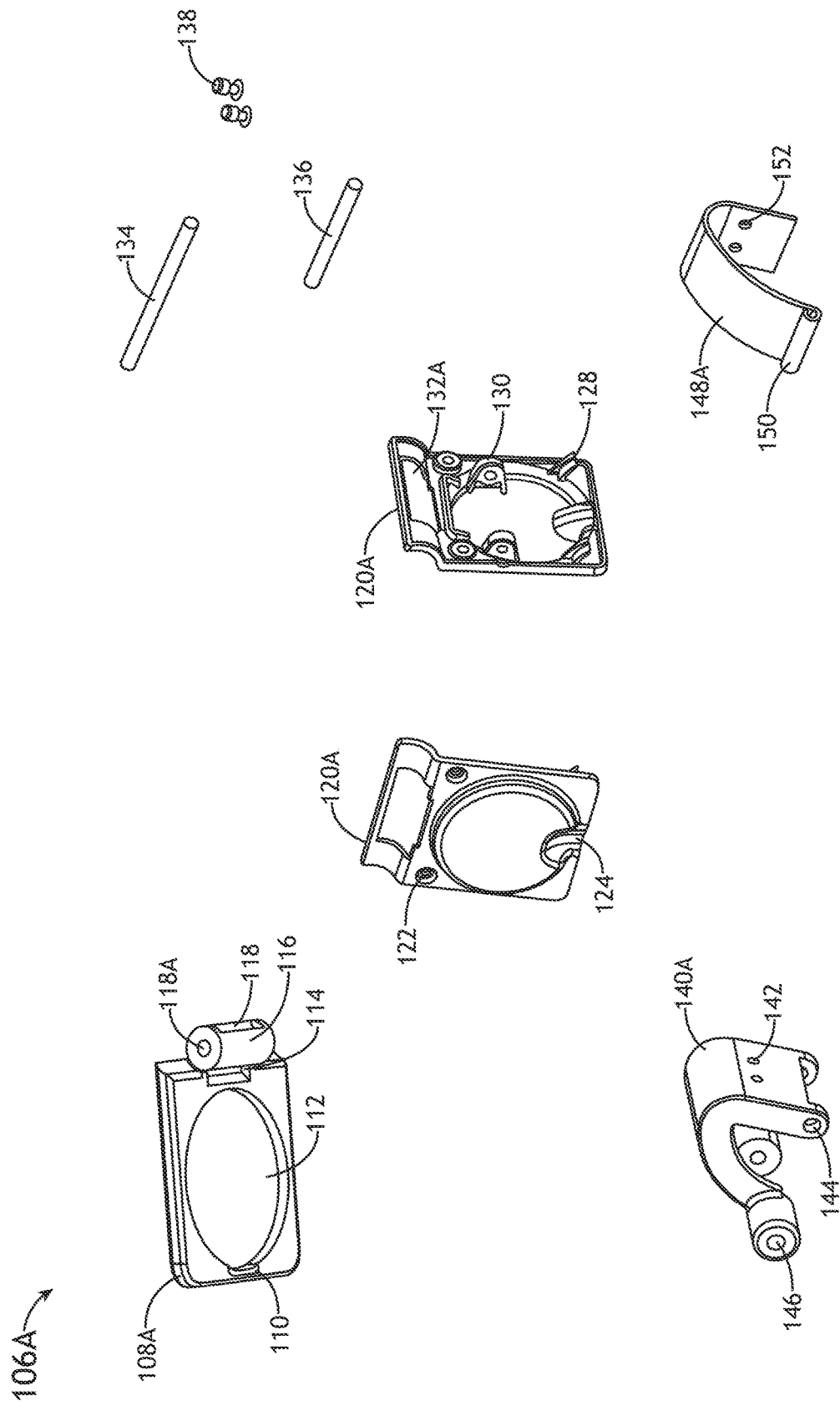

Referring now to FIG. 17, an exploded view of the top-hinged resettable cupholder apparatus 106A of FIG. 3 is shown.

Referring still to FIGS. 14-17, the top-hinged resettable cupholder apparatus 106A of FIG. 3 may include any or all of the following: a cupholder member 108A, a mount member 120A, a first pin 134, a second pin 136, at least one (e.g., two) rivet 138, a curved pivot arm 140A, and/or a cantilever spring 148A.

The cupholder member 108A may include a finger tab 110, a cup hole 112, a stowed detent 114, a bearing face 116, a deployed detent 118, and/or a cupholder member pivot portion 118A. The cupholder member pivot portion 118A may include (e.g., include all or a portion of) any or all of the following: the stowed detent 114, the bearing face 116, and/or the deployed detent 118. The bearing face 116 may be positioned between the stowed detent 114 and the deployed detent 118.

The mount member 120A may be configured to mount to the back 104 of the seat 102. The mount member 120A may include mounting holes 122, a finger tab recess 124, a pivot stop 126, pivot brackets 130, attachment tabs 128, and/or a pivot arm cutout 132A.

The curved pivot arm 140A may include first pivot arm pivot portions 146, second pivot arm pivot portions 144, and/or attachment holes 142 (e.g., to accommodate the rivets 138).

The cantilever spring 148A may include a spring bearing face 150 and/or attachment holes 152 (e.g., to accommodate the rivets 138). The cantilever spring 148A may apply a force to the cupholder member pivot portion 118A. The cantilever spring may be composed of any suitable material, such as spring steel (e.g., 1095 steel).

The resettable cupholder apparatus 106A may be in a stowed position when the spring bearing face 150 is located in the stowed detent 114. The resettable cupholder apparatus 106A may be in a deployed position when the spring bearing face 150 is located in the deployed detent 118.

When a threshold downward force is applied to the cupholder member 108A while the cupholder member 108A is in the deployed position, the cantilever spring 148A may be configured to move out of the deployed detent 118 such that the resettable cupholder apparatus 106A breaks over without causing damage to the resettable cupholder apparatus 106A. When in a broken over state, the resettable cupholder apparatus 106A may be resettable to the deployed position.

When no external forces are applied to the cupholder member 108A, the resettable cupholder apparatus 106A may be configured to move to the stowed position if the spring bearing face 150 is within any portion of the stowed detent 114. The stowed detent 114 can cause the cupholder member 108A to return to the stowed position if the cupholder member 108A is rotated less than a threshold amount (e.g., 15 degrees, or any designed for amount of rotation).

The curved pivot arm 140A may be connected to the cupholder member pivot portion 118A with the first pin 134. The curved pivot arm 140A may be connected to the mount member 120A with the second pin 136. The curved pivot arm 140A may extend through the pivot arm cutout 132A. The curved pivot arm 140A may allow the cupholder member pivot portion 118A to extend away from the mount member 120A as the resettable cupholder apparatus 106A moves from the stowed position toward the deployed position.

The cantilever spring 148A may be curved. The cantilever spring 148A may be attached to the curved pivot arm 140A, such as with rivets 138. The cantilever spring 148A may extend through the pivot arm cutout 132A such that the spring bearing face 150 may apply force to and engage with the stowed detent 114, the bearing face 116, or the deployed detent 118 at any given time.

Figure 18:
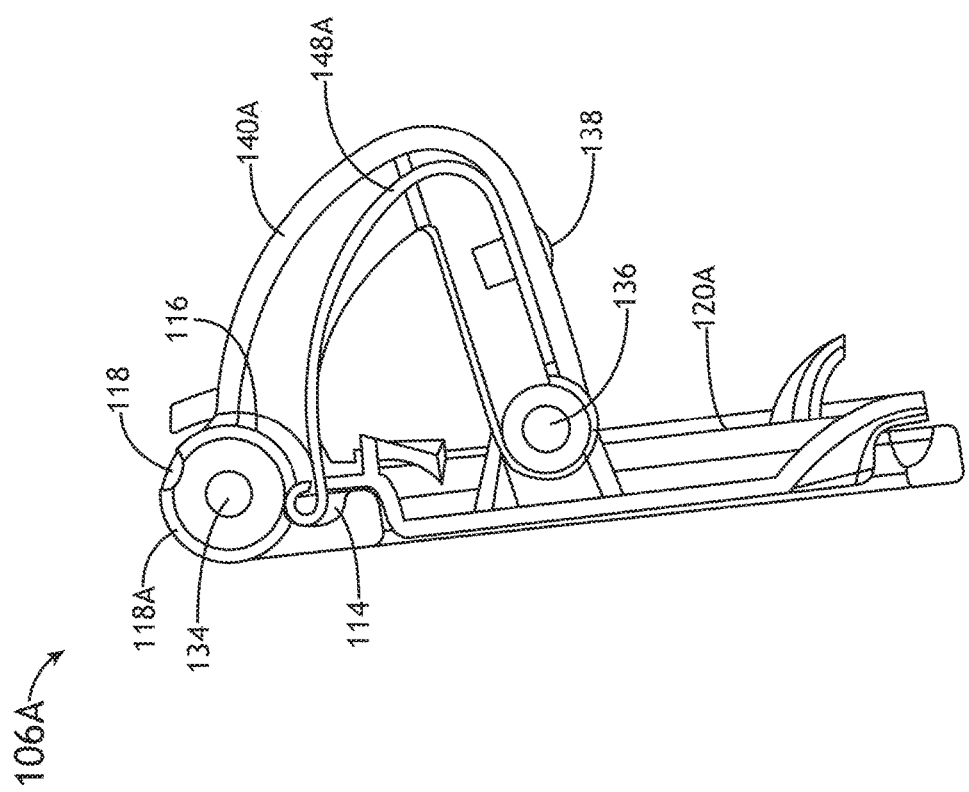

Referring now to FIG. 18, a side view of the top-hinged resettable cupholder apparatus 106A of FIG. 3 is shown in a stowed position. The cantilever spring 148A may apply a force to the stowed detent 114, the bearing face 116, or the deployed detent 118 at any given time. When in a stowed position, an initial pre-bend of the cantilever spring 148A may apply a force to the stowed detent 114 such that the top-hinged resettable cupholder apparatus 106A remains in the stowed position.

Figure 19:
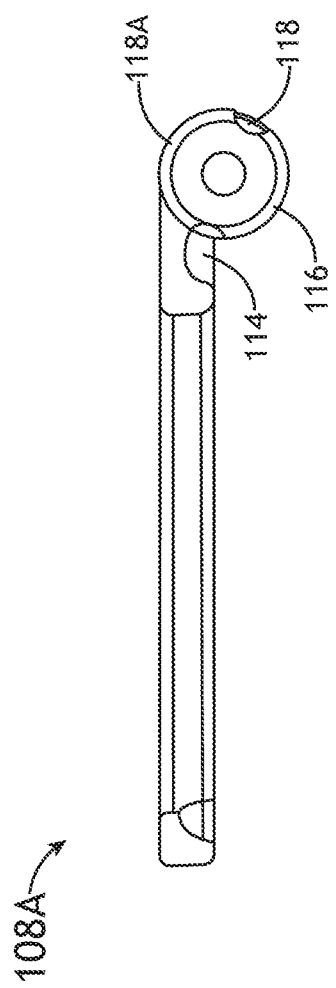

Referring now to FIG. 19, a side view of the cupholder member 108A of the top-hinged resettable cupholder apparatus 106A of FIG. 3 is shown.

Figure 21:
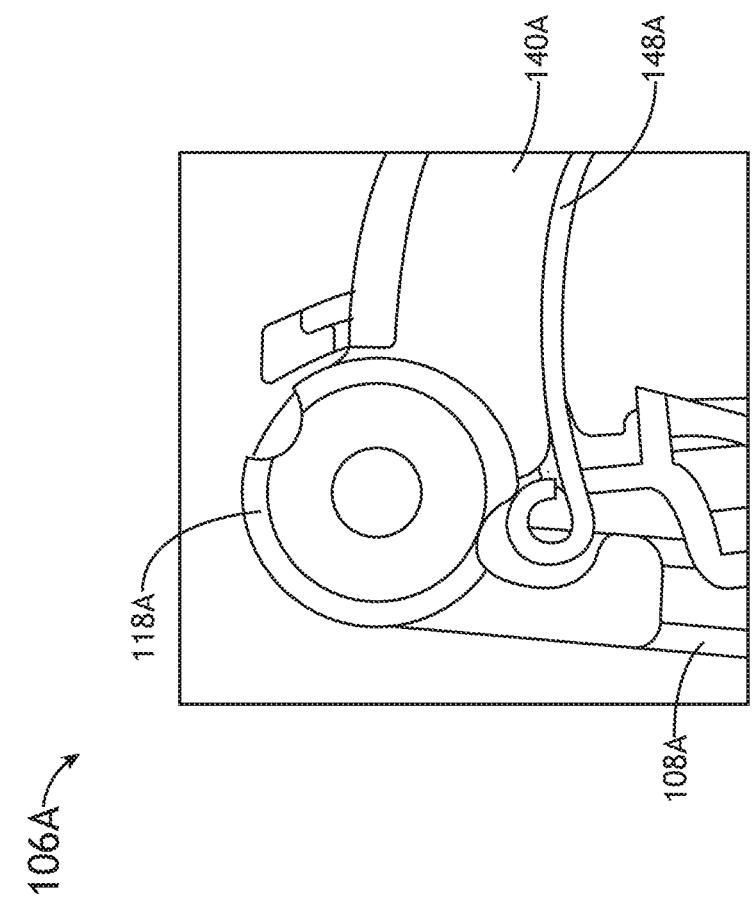
Figure 20:
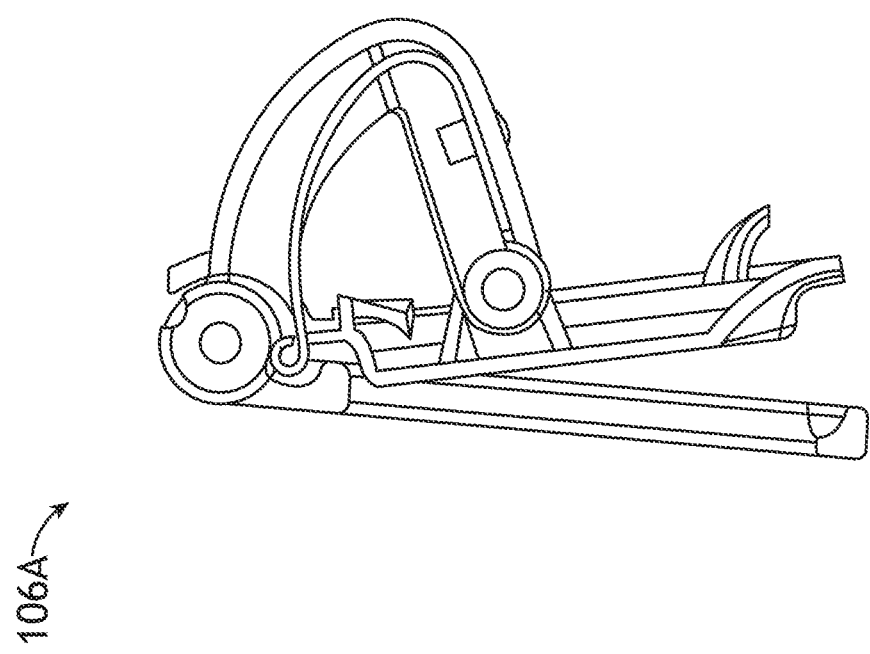

Referring now to FIGS. 20-21, side views of the top-hinged resettable cupholder apparatus 106A of FIG. 3 partially opened are shown between the stowed position and the deployed position. As the cupholder member 108A is rotated open, the stowed detent 114 geometry may move the spring bearing face 150 down and out of the way to allow deployment. In an exemplary embodiment, the cupholder member 108A may need to rotate approximately 15 degrees (e.g., 15 degrees+/−1 degree) to fully clear the stowed detent 114; however, the stowed detent 114 may be designed for any desired amount of rotation to cause the cupholder member 108A to move to the stowed position. For example, if the cupholder member 108A is left alone in this 15-degree zone with no external forces applied, whether opening or closing, the cupholder member 108A may be configured to move to the stowed position.

Figure 22:
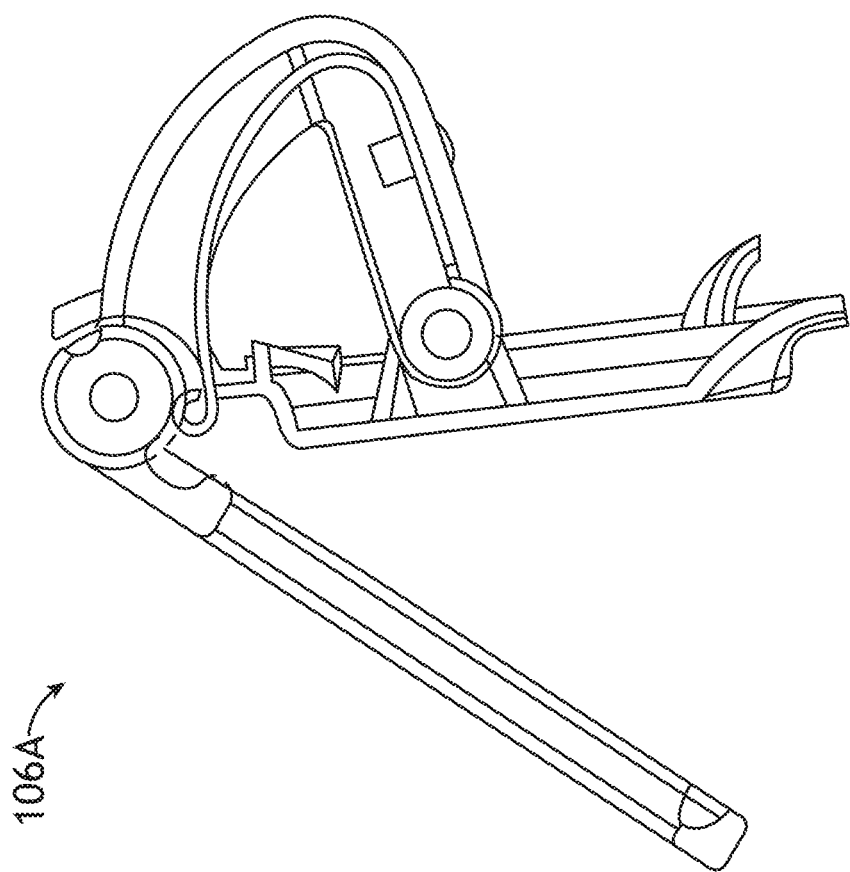

Referring now to FIG. 22, a side view of the top-hinged resettable cupholder apparatus 106A of FIG. 3 partially opened is shown between the stowed position and the deployed position. Once the spring bearing face 150 is clear of the stowed detent 114, the spring bearing face 150 may apply a frictional force to the bearing face 116 as the cupholder member 108A opens.

Figure 23:
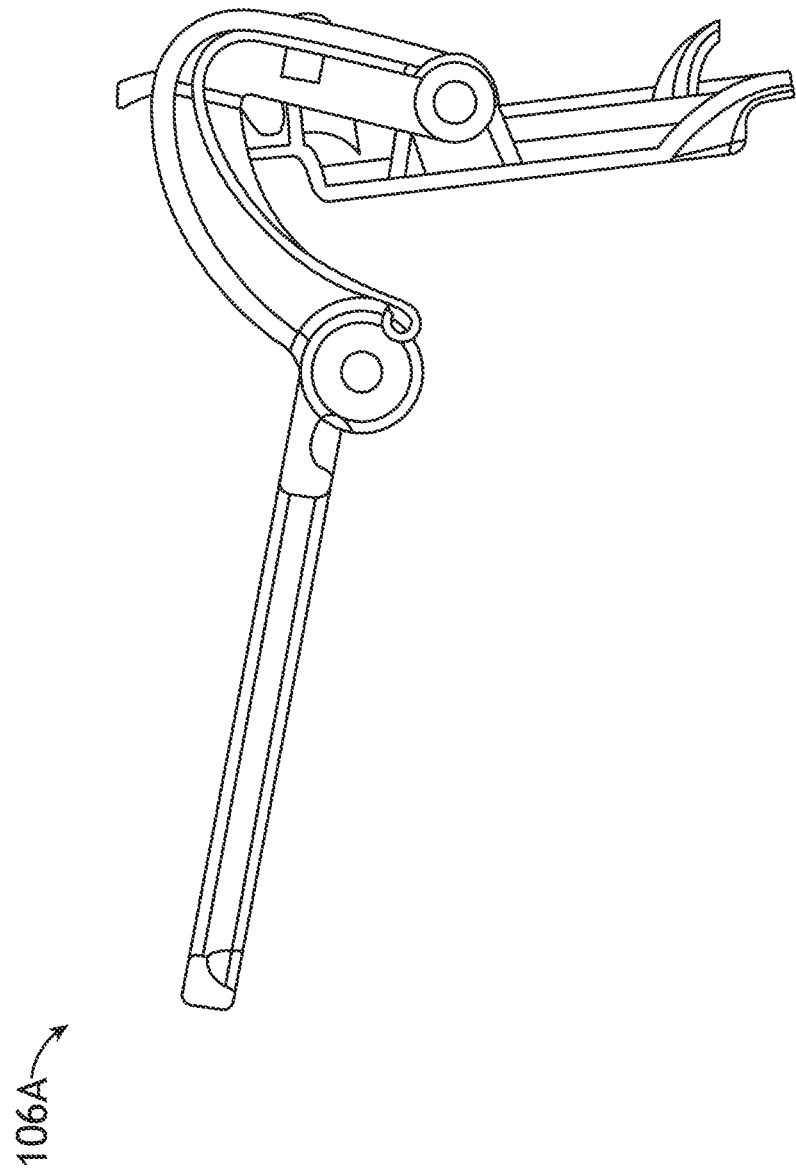

Referring now to FIG. 23, a side view of the top-hinged resettable cupholder apparatus 106A of FIG. 3 is shown in the deployed position. The cupholder member 108A may continue to rotate open until the cupholder member 108A reaches an edge of the deployed detent 118 where the spring bearing face 150 presses against an angled edge of the deployed detent 118 causing the cupholder member 108A to move to the deployed position; simultaneously, the curved pivot arm 140A may rotate around the second pin 136 (e.g., installed through the second pivot arm pivot portions 144) causing the cupholder member 108A to extend away from the mount member 120A.

Figure 24:
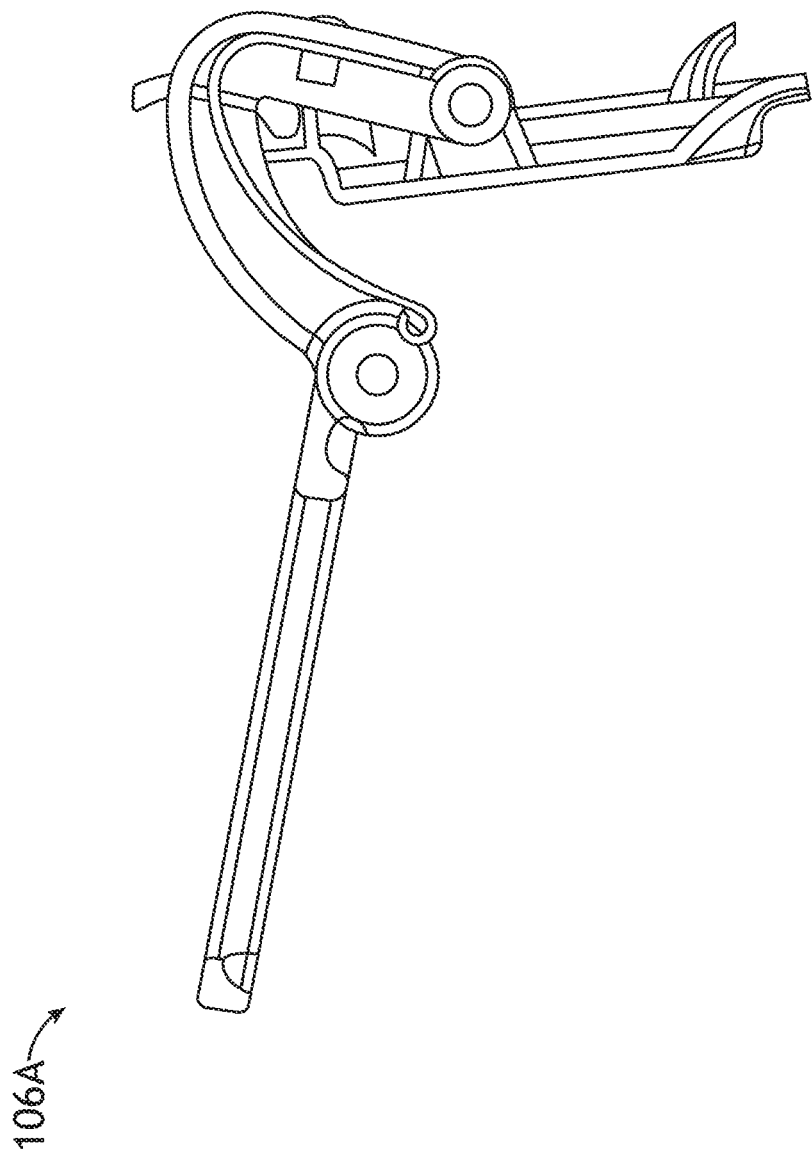

Referring now to FIG. 24, a side view of the top-hinged resettable cupholder apparatus 106A of FIG. 3 is shown in the deployed position. The resettable cupholder apparatus 106A may be held in the deployed position by the spring bearing face applying a force to the deployed detent 118 such that the resettable cupholder apparatus 106A can accept and support a cup in the deployed position.

Figure 25:
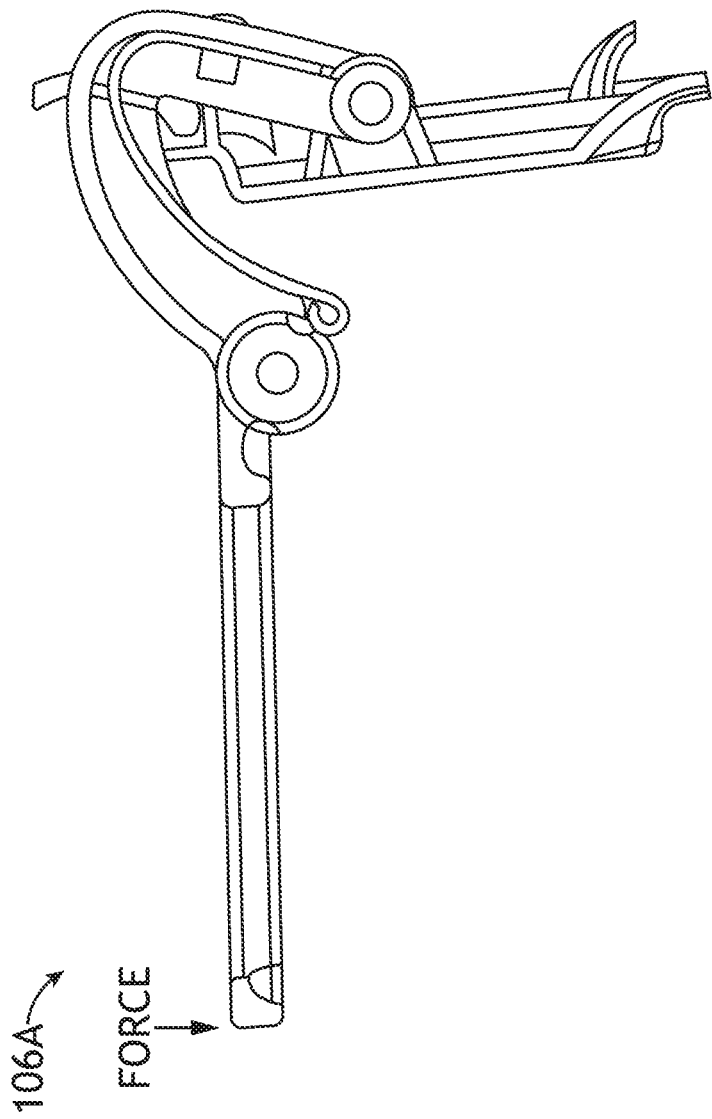

Referring now to FIG. 25, a side view of the top-hinged resettable cupholder apparatus 106A of FIG. 3 is shown moving from the deployed position to the stowed position. To stow, the cupholder member 108A may be rotated counter-clockwise (as shown in FIG. 25) by a downward force applied at the cupholder member's 108A end. The pivot stop 126 may keep the curved pivot arm 140A from rolling outward as the deployed detent 118 geometry compresses the cantilever spring 148A, which in turn may increase a required force to close the resettable cupholder apparatus 106A. Any action to stow or close the resettable cupholder apparatus 106A may be required to overcome such force until the spring bearing face 150 is deflected out of the deployed detent 118, which for example may be for approximately 15 degrees of rotation (or any other suitable designed for amount of rotation).

Figure 27:
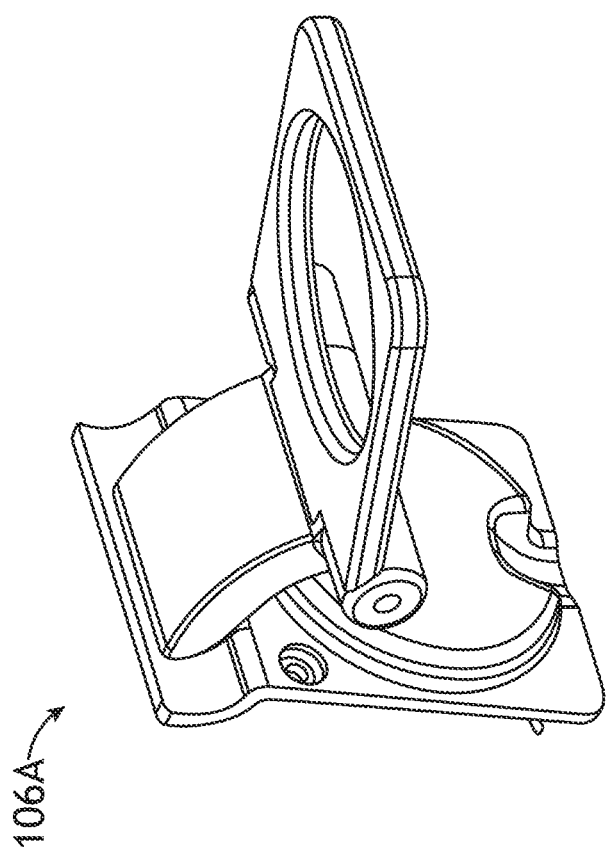
Figure 26:
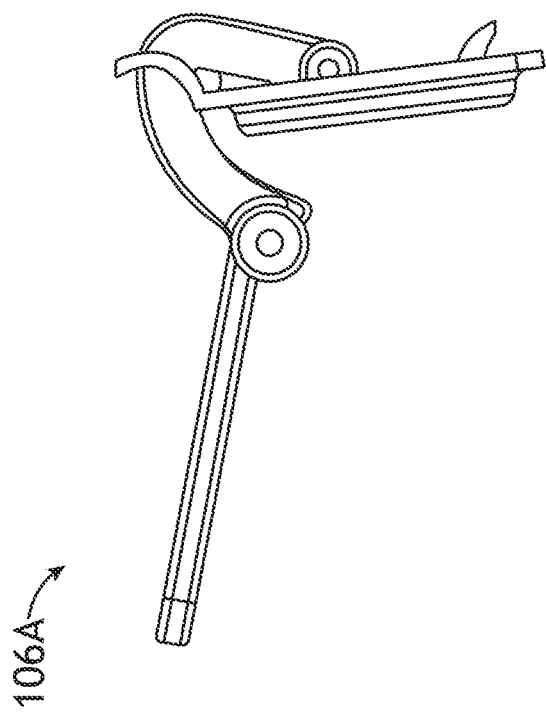

Referring now to FIGS. 26-27, views of the top-hinged resettable cupholder apparatus 106A of FIG. 3 are shown in the deployed position. For cup holders that do not extend away from a mounting location (e.g., locations where vertical mounting space may be limited), there may not be enough distance between a hinge axis and a center of the cup hole to extend the cup far enough from the mount causing cup and mount interference. In exemplary embodiments of the top-hinged resettable cupholder apparatus 106A, the curved pivot arm's 140A ability to rotate around the second pin 136 may allow the cupholder member 108A to extend away from the mount member 120A to prevent cup interference with the surrounding components.

Referring now to FIGS. 28-31, views of an exemplary embodiment of a top-hinged resettable cupholder apparatus 106C depicting various components and positions are shown. The top-hinged resettable cupholder apparatus 106C may function similarly to and have components similar to the top-hinged resettable cupholder apparatus 106A, except that the top-hinged resettable cupholder apparatus 106C may omit one or more components, have one or more additional components, and/or have one or more differently shaped components. For example, the top-hinged resettable cupholder apparatus 106C may lack the curved pivot arm's 140A (of 106A) and the ability of the cupholder member 108A to extend away from the mount member 120A to prevent cup interference with the surrounding components. For example, the top-hinged resettable cupholder apparatus 106C may be suitable for use where additional extension is not desired. The top-hinged resettable cupholder apparatus 106C may simply open and close, and have the ability to resettably break over. For example, the top-hinged resettable cupholder apparatus 106C may lack the curved pivot arm 140A, and the cantilever spring 148C may be mounted to a rear of the mount member 120C.

Referring now to FIG. 28, a front view of the top-hinged resettable cupholder apparatus 106C is shown in a stowed position.

Figure 29:
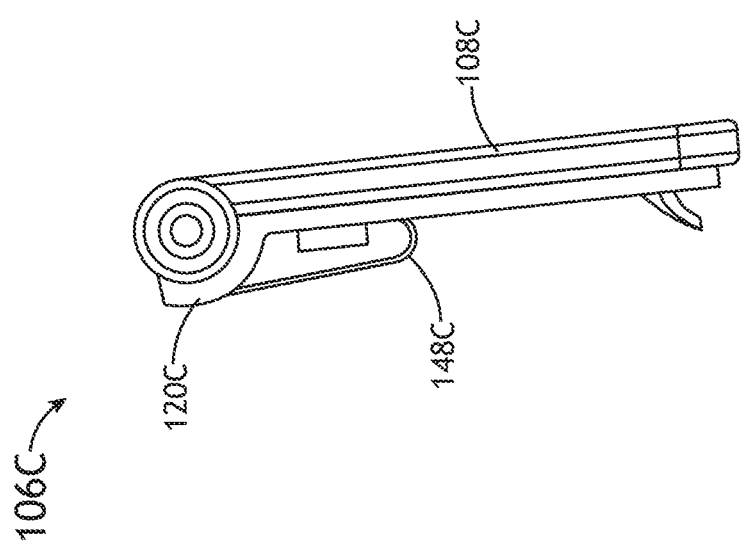

Referring now to FIG. 29, a side view of the top-hinged resettable cupholder apparatus 106C is shown in the stowed position.

Figure 30:
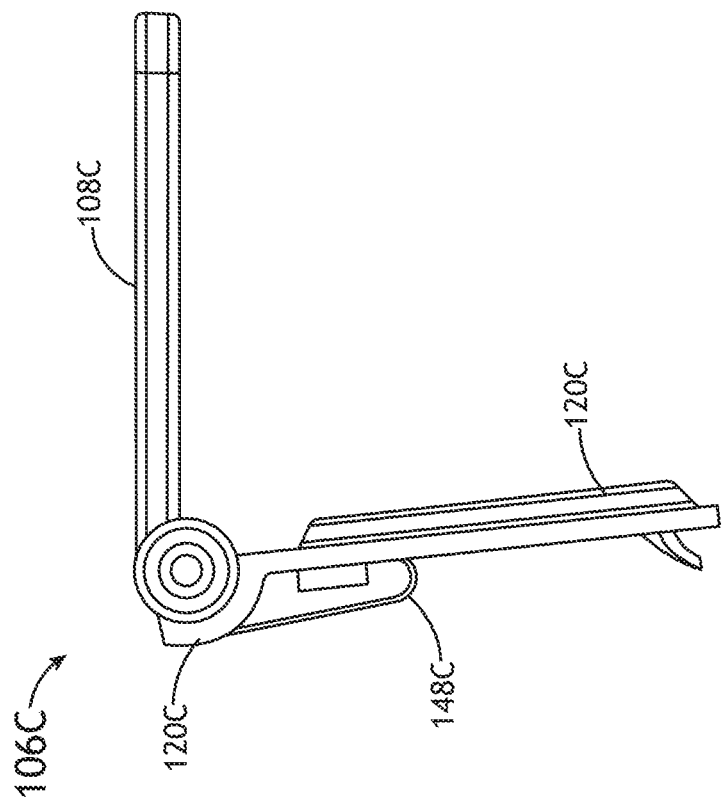

Referring now to FIG. 30, a side view of the top-hinged resettable cupholder apparatus 106C 3 is shown in a deployed position.

Figure 31:
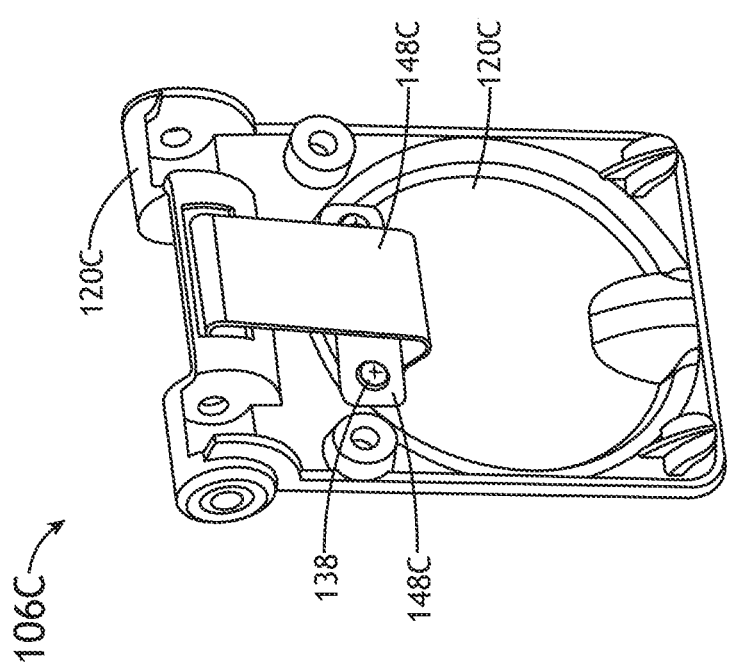

Referring now to FIG. 31, a rear view of a portion of the top-hinged resettable cupholder apparatus 106C is shown.

Referring still to FIGS. 28-31, the top-hinged resettable cupholder apparatus 106C may include any or all of the following: a cupholder member 108C, a mount member 120C, a pin 134, at least one (e.g., two) rivet 138, and/or a cantilever spring 148C, some or all of which may function similarly and be shaped similarly to corresponding components of the top-hinged resettable cupholder apparatus 106A, except for differences shown in FIGS. 28-31 and described herein. The mount member 120C may be connected to the cupholder member pivot portion (e.g., similar to 118A) with the pin 134. The cantilever spring 148C may be curved, and the cantilever spring 148C may be attached to a rear of the mount member 120C with rivets 138.

Referring now to FIGS. 32-49, views of the exemplary embodiment of the bottom-hinged resettable cupholder apparatus 106B of FIG. 5 are shown. The bottom-hinged resettable cupholder apparatus 106B may function similarly to and have components similar to the top-hinged resettable cupholder apparatus 106A, except that the bottom-hinged resettable cupholder apparatus 106B is bottom-hinged, may omit one or more components, include one or more other components, and/or have one or more differently shaped components. For example, the bottom-hinged resettable cupholder apparatus 106B may lack the ability of the cupholder member 108A to extend away from the mount member 120A to prevent cup interference with the surrounding components. Instead of extending out like the top-hinged resettable cupholder apparatus 106A, the bottom-hinged resettable cupholder apparatus 106B may simply rotate open and closed. The bottom-hinged resettable cupholder apparatus 106B may incorporate similar mechanics as the top-hinged resettable cupholder apparatus 106A in a slightly different package.

Figure 32:
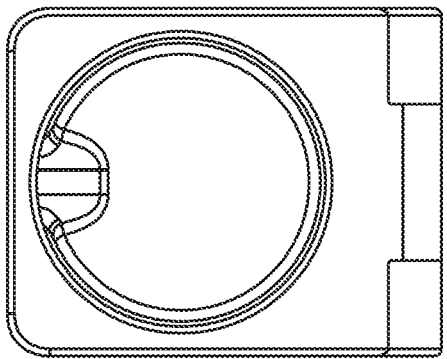

Referring now to FIG. 32, a front view of the bottom-hinged resettable cupholder apparatus 106B is shown in a stowed position.

Figure 33:
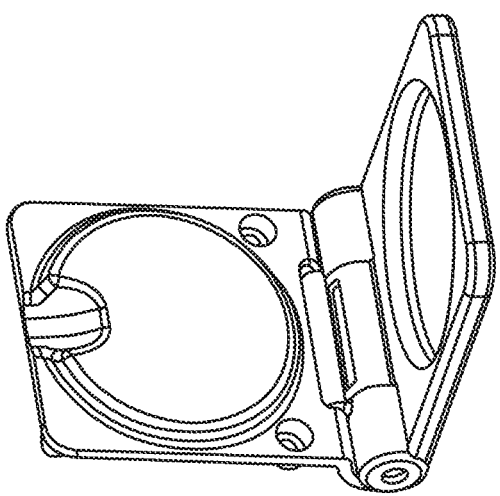

Referring now to FIG. 33, a perspective view of the bottom-hinged resettable cupholder apparatus 106B is shown in a deployed position.

Figure 34:
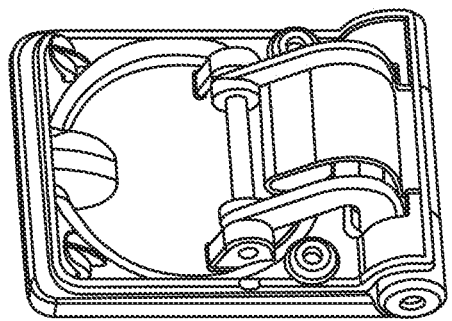
FIGS. 32, 33, 34, 35, 36, 37, 38, 39, 40, 41, 42, 43, 44, 45, 46, 47, 48, and 49 are views of the bottom-hinged resettable cupholder apparatus of FIG. 5 according to the inventive concepts disclosed herein.

Referring now to FIG. 34, a rear perspective view of the bottom-hinged resettable cupholder apparatus 106B is shown in a stowed position.

Referring now to FIGS. 35-38, views of the exemplary embodiment of the bottom-hinged resettable cupholder apparatus 106B depicting various components are shown.

Figure 37:
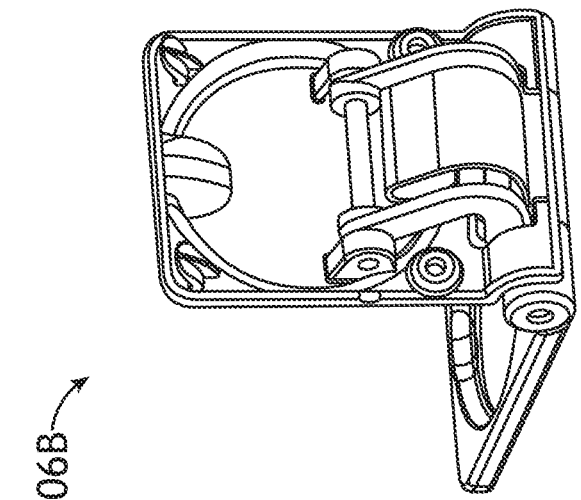
Figure 36:
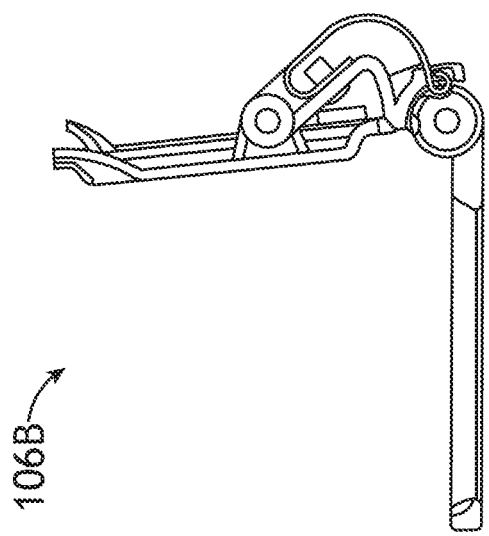
Figure 35:
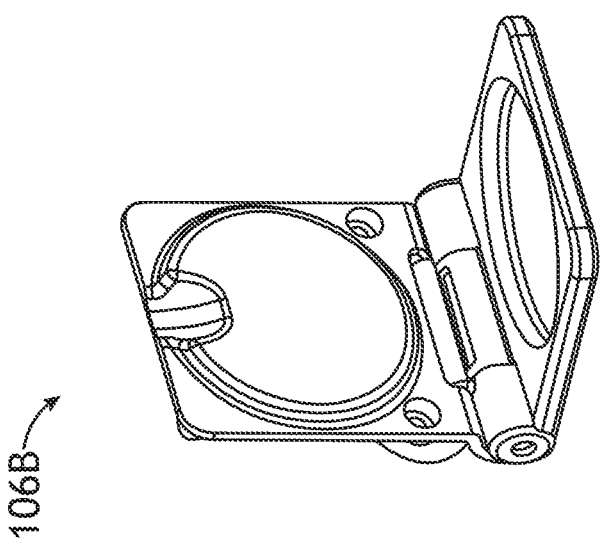

Referring now to FIGS. 35-37, various views of the bottom-hinged resettable cupholder apparatus 106B are shown in a deployed position.

Figure 38:
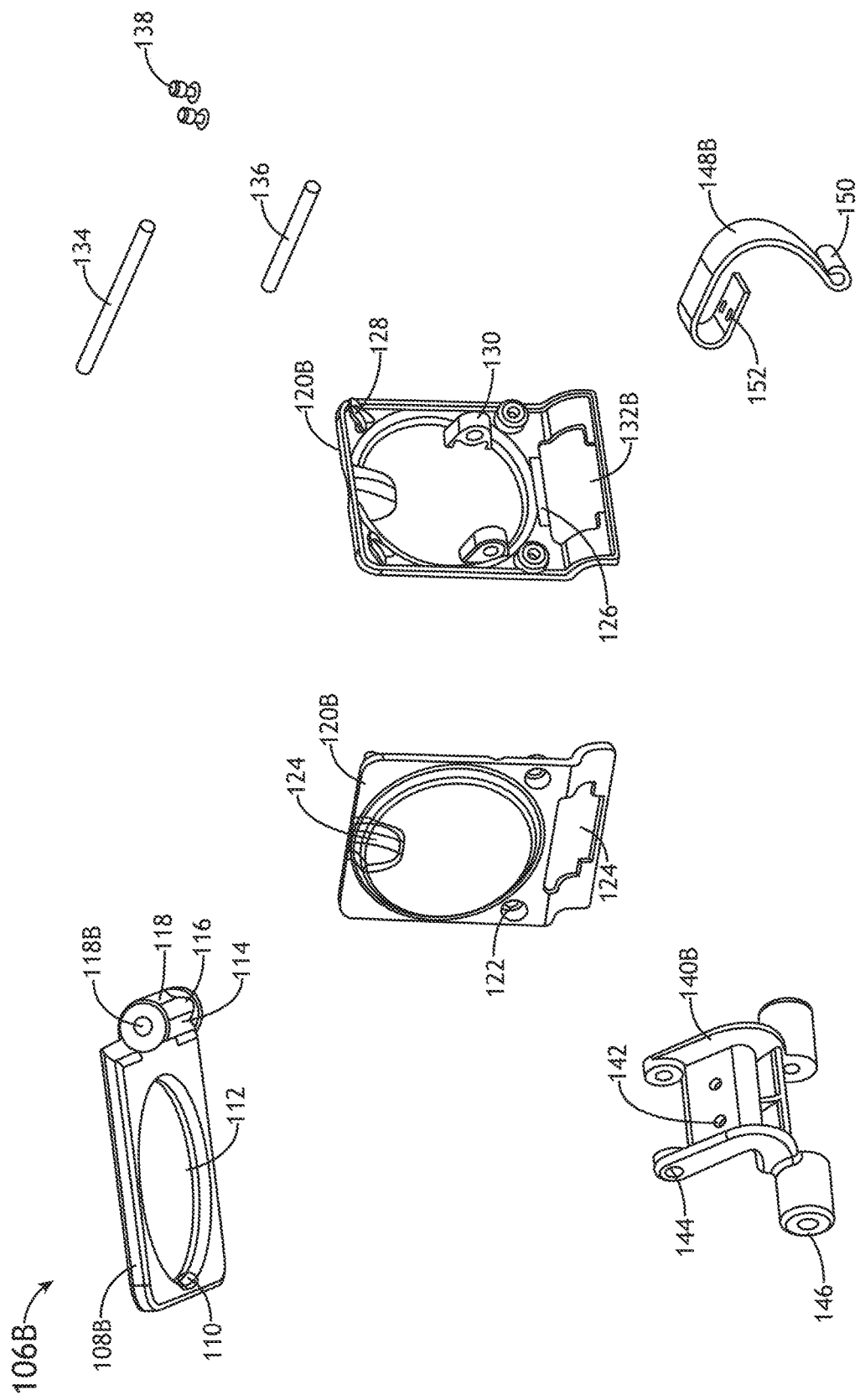

Referring now to FIG. 38, an exploded view of the bottom-hinged resettable cupholder apparatus 106B is shown.

Referring still to FIGS. 35-38, the bottom-hinged resettable cupholder apparatus 106B may include any or all of the following: a cupholder member 108B, a mount member 120B, a first pin 134, a second pin 136, at least one (e.g., two) rivet 138, a curved pivot arm 140B, and/or a cantilever spring 148B, some or all of which may function similarly and be shaped similarly to corresponding components of the top-hinged resettable cupholder apparatus 106A, except for differences shown in FIGS. 32-49 and described herein.

The cupholder member 108B may include a finger tab 110, a cup hole 112, a stowed detent 114, a bearing face 116, a deployed detent 118, and/or a cupholder member pivot portion 118B. The cupholder member pivot portion 118B may include (e.g., include all or a portion of) any or all of the following: the stowed detent 114, the bearing face 116, and/or the deployed detent 118. The bearing face 116 may be positioned between the stowed detent 114 and the deployed detent 118.

The mount member 120B may be configured to mount to the back 104 of the seat 102. The mount member 120B may include mounting holes 122, a finger tab recess 124, a pivot stop 126, pivot brackets 130, attachment tabs 128, and/or a pivot arm cutout 132B.

The curved pivot arm 140B may include first pivot arm pivot portions 146, second pivot arm pivot portions 144, and/or attachment holes 142 (e.g., to accommodate the rivets 138). The curved pivot arm 140B may be connected to the cupholder member pivot portion 118B with a first pin 134. The curved pivot arm 140B may be connected to the mount member 120B with a second pin 136. The curved pivot arm 140B may extend through the pivot arm cutout 132B. The curved pivot arm 140B may be configured to move through the pivot arm cutout 132B when the resettable cupholder apparatus 106B moves past the deployed position 118 in the broken over state.

The cantilever spring 148B may include a spring bearing face 150 and/or attachment holes 152 (e.g., to accommodate the rivets 138). The cantilever spring 148B may apply a force to the cupholder member pivot portion 118B. The cantilever spring 148B may be composed of any suitable material, such as spring steel (e.g., 1095 steel). The cantilever spring 148B may be curved, and the cantilever spring 148B may be attached to the curved pivot arm 140B. The cantilever spring 148B may extend through the pivot arm cutout 132B.

Figure 41:
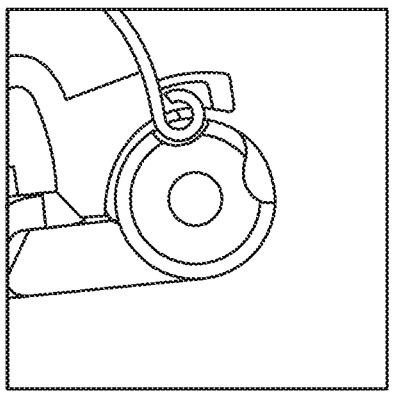
Figure 40:
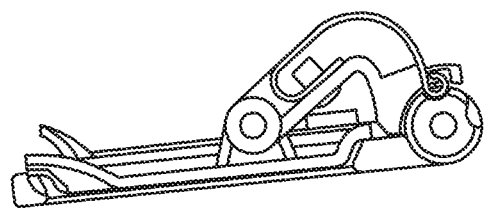
Figure 39:
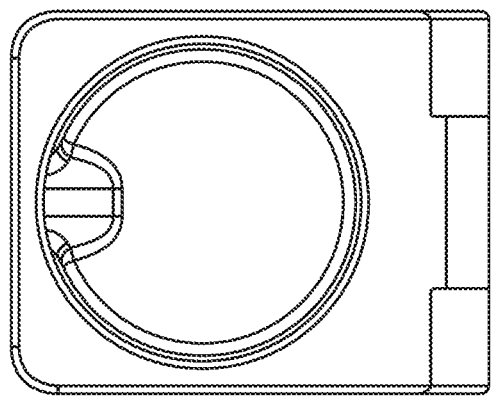

Referring now to FIGS. 39-41, various views of the bottom-hinged resettable cupholder apparatus 106B are shown in a stowed position.

Figure 43:
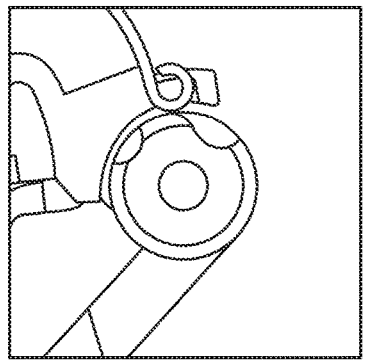
Figure 42:
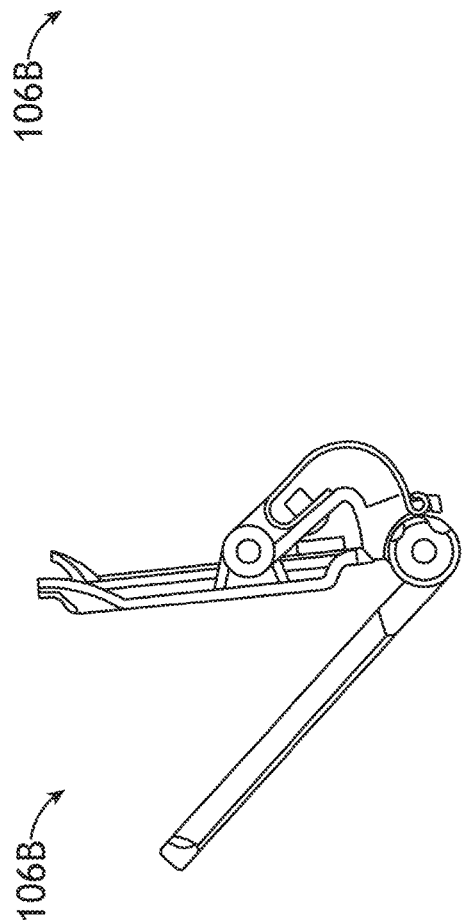

Referring now to FIGS. 42-43, various views of the bottom-hinged resettable cupholder apparatus 106B are shown in between the stowed position and the deployed position.

Figure 45:
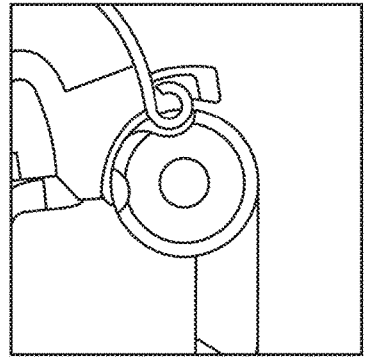
Figure 44:
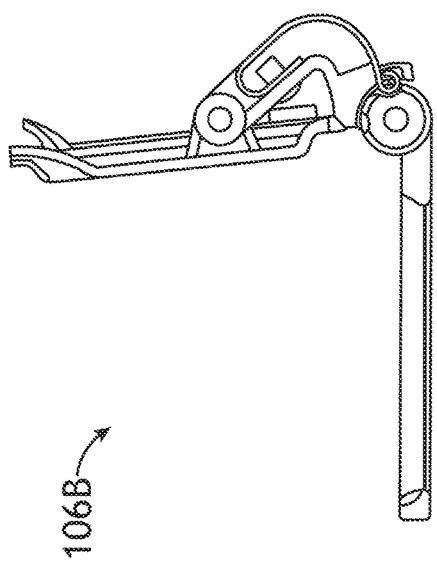

Referring now to FIGS. 44-45, various views of the bottom-hinged resettable cupholder apparatus 106B are shown in the deployed position.

Figure 48:
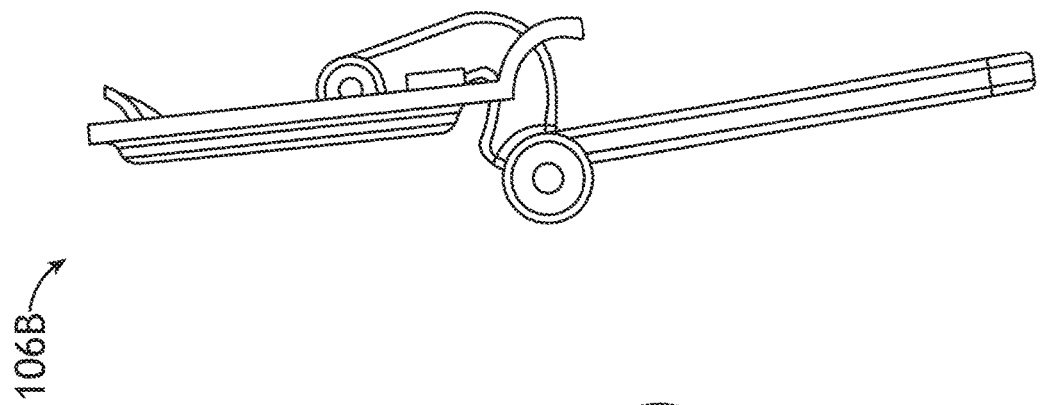
Figure 47:
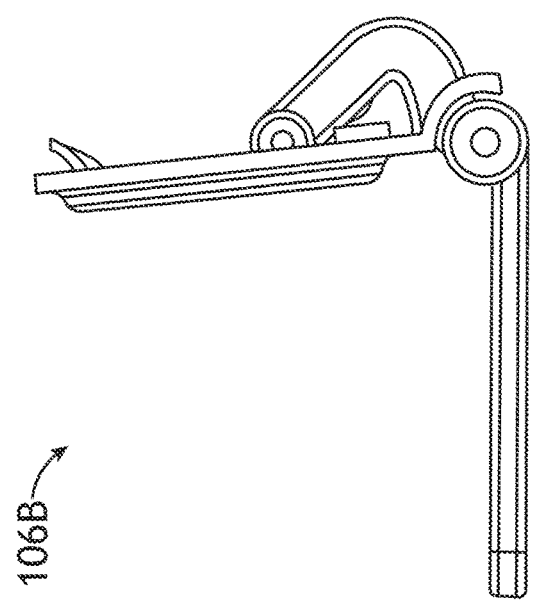
Figure 46:
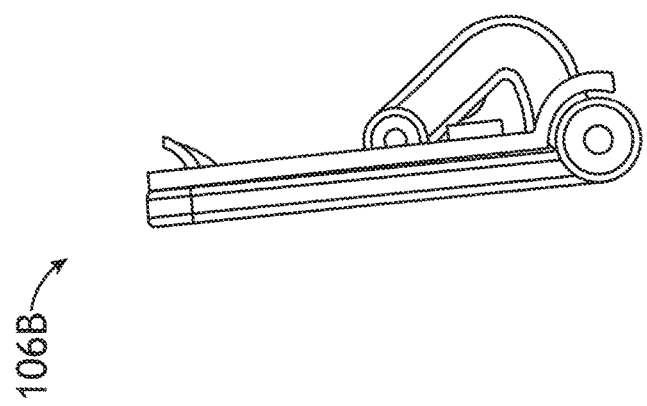
Figure 49:
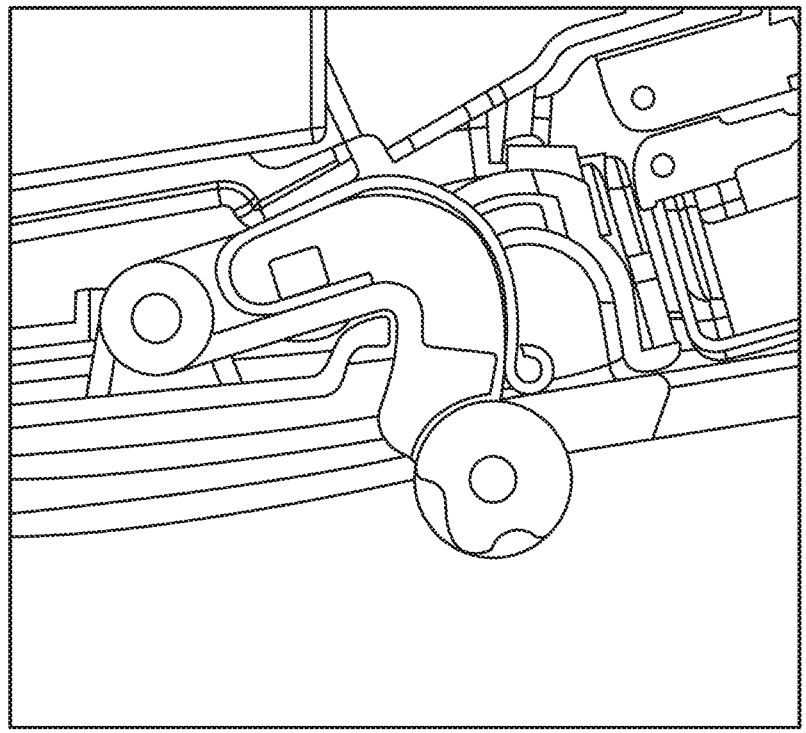

Referring now to FIGS. 46-49, various views of the bottom-hinged resettable cupholder apparatus 106B are shown transitioning from the stowed position (as shown in FIG. 46), to the deployed position (as shown in FIG. 47), to a broken over state (as shown in FIGS. 48-49). For the bottom-hinged resettable cupholder apparatus 106B, the secondary pivot action does not activate during normal use (e.g., unless the bottom-hinged resettable cupholder apparatus 106B is broken over). The secondary pivot action may only activate during a break over event when subjected to a force exceeding a threshold force, for example, the amount of force that would break a currently typical cupholder. The secondary pivot action allows the bottom-hinged resettable cupholder apparatus 106B to extend out enough to clear the recess where cupholders are typically mounted so as to prevent damage to the surrounding areas.

Referring now to FIGS. 50-53, views of an exemplary embodiment of a bottom-hinged resettable cupholder apparatus 106D depicting various components and positions are shown. The bottom-hinged resettable cupholder apparatus 106D may function similarly to and have components similar to the bottom-hinged resettable cupholder apparatus 106B, except that bottom-hinged resettable cupholder apparatus 106D may omit one or more components, have one or more additional components, and/or have one or more differently shaped components. For example, the bottom-hinged resettable cupholder apparatus 106D may lack the curved pivot arm 140B (of 106B) and the ability of the cupholder member 108B to extend away from the mount member 120B during a break over event. The bottom-hinged resettable cupholder apparatus 106D may simply open and close. For example, the bottom-hinged resettable cupholder apparatus 106D may lack the curved pivot arm 140B, and the cantilever spring 148D may be mounted to a rear of the mount member 120D. For example, the bottom-hinged resettable cupholder apparatus 106D may be suitable if the cupholder is not recessed and did not need to pivot out away from a mount position during a break over event. The bottom-hinged resettable cupholder apparatus 106D may still have resettable break over functionality.

Figure 50:
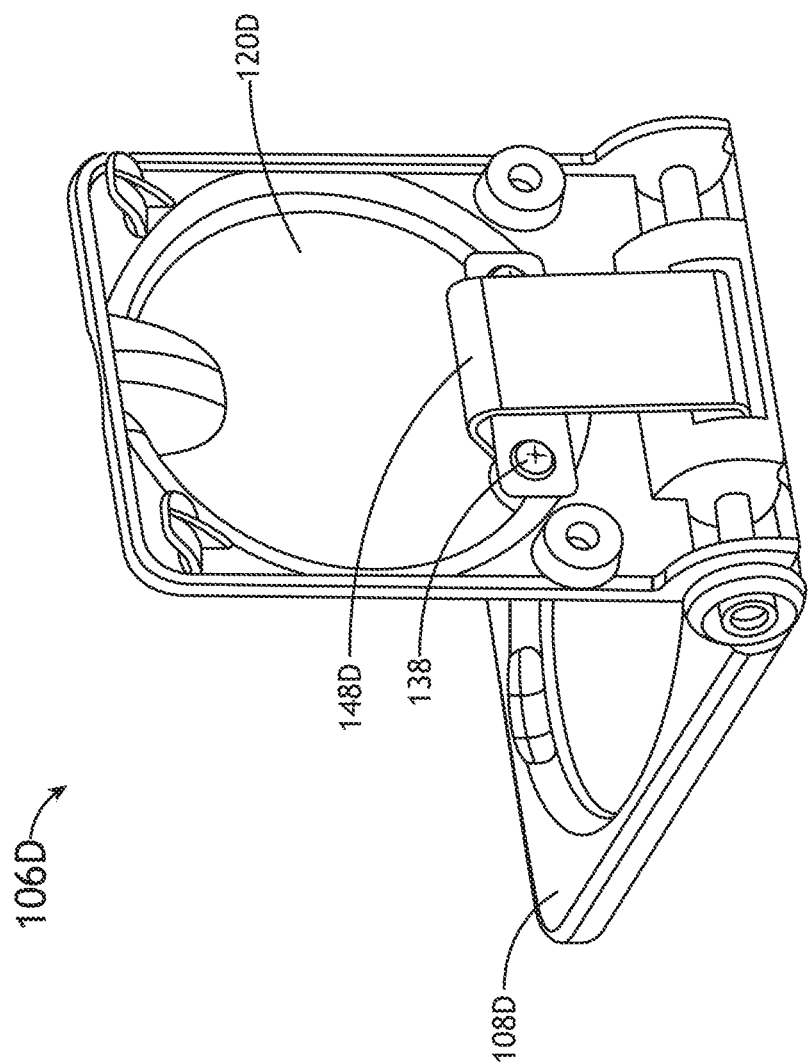
FIGS. 50, 51, 52, and 53 are views of an exemplary embodiment of a bottom-hinged resettable cupholder apparatus according to the inventive concepts disclosed herein.

Referring now to FIG. 50, a rear perspective view of the bottom-hinged resettable cupholder apparatus 106D is shown in a deployed position.

Figure 51:
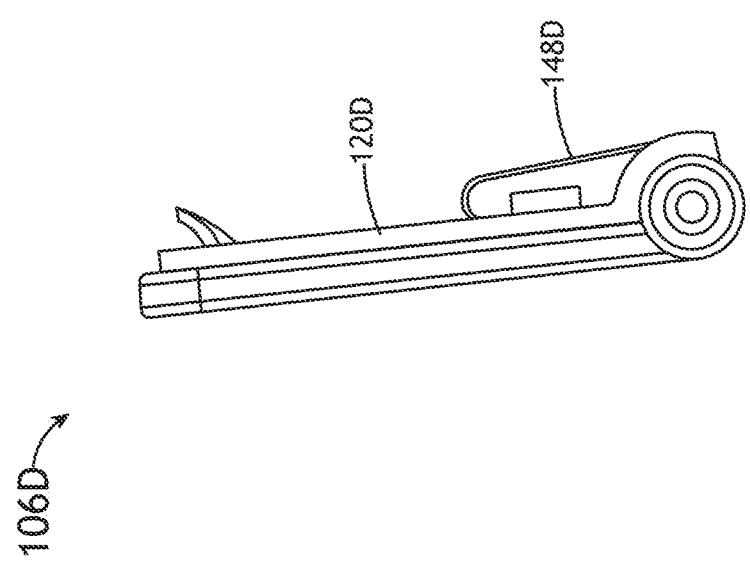

Referring now to FIG. 51, a side view of the bottom-hinged resettable cupholder apparatus 106D is shown in the stowed position.

Figure 52:
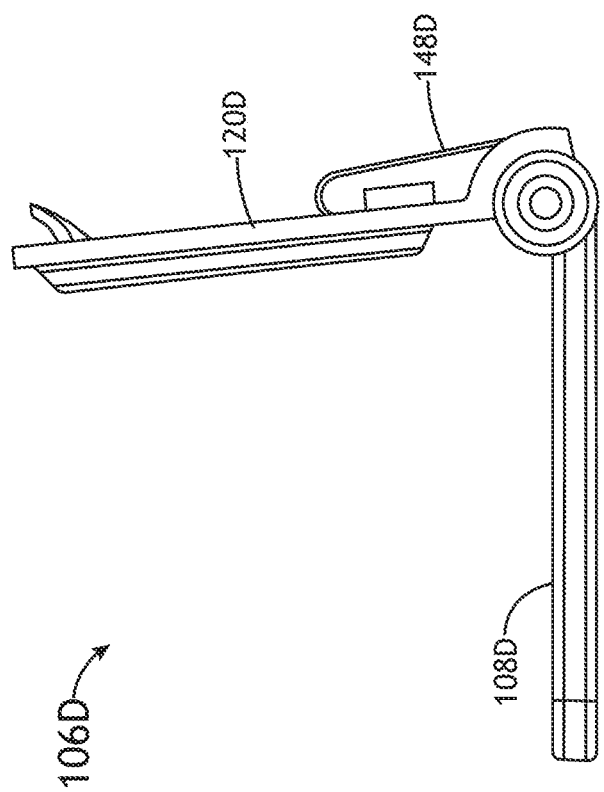

Referring now to FIG. 52, a side view of the bottom-hinged resettable cupholder apparatus 106D is shown in a deployed position.

Figure 53:
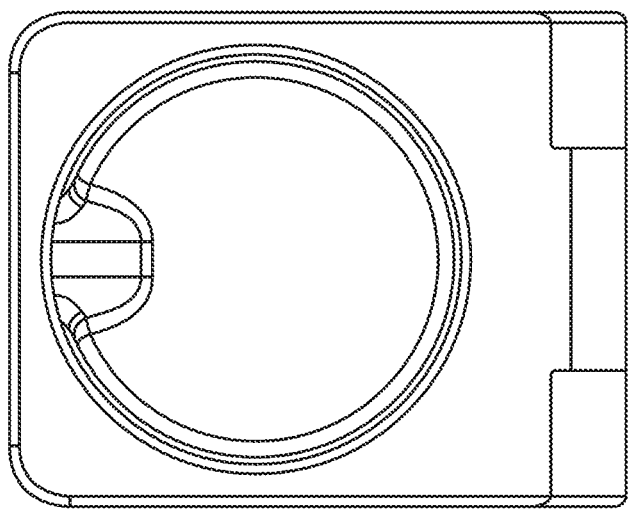

Referring now to FIG. 53, a front view of the bottom-hinged resettable cupholder apparatus 106D is shown in a stowed position.

Referring still to FIGS. 50-53, the bottom-hinged resettable cupholder apparatus 106D may include any or all of the following: a cupholder member 108D, a mount member 120D, a pin 134, at least one (e.g., two) rivet 138, and/or a cantilever spring 148D, some or all of which may function similarly and be shaped similarly to corresponding components of the bottom-hinged resettable cupholder apparatus 106B, except for differences shown in FIGS. 50-53 and described herein. The mount member 120D may be connected to the cupholder member pivot portion (e.g., similar to 118B) with the pin 134. The cantilever spring 148D may be curved, and the cantilever spring 148D may be attached to a rear of the mount member 120D with rivets 138.

As will be appreciated from the above, embodiments of the inventive concepts disclosed herein may be directed to a system including a resettable cupholder apparatus.

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
    a resettable cupholder apparatus, comprising:
        a cupholder member having a cup hole, the cupholder member comprising:
            a cupholder member pivot portion having a first detent for a stowed position, a second detent for a deployed position, and a bearing face positioned between the first detent and the second detent; and
        a cantilever spring having a spring bearing face, a first end of the cantilever spring attached to a portion of the resettable cupholder apparatus, the spring bearing face positioned at an opposite end from the first end of the cantilever spring, the opposite end of the cantilever spring being unattached to the resettable cupholder apparatus, wherein the spring bearing face of the cantilever spring applies a force to the cupholder member pivot portion,
        wherein the resettable cupholder apparatus is in the stowed position when the spring bearing face is located in the first detent, wherein the resettable cupholder apparatus is in the deployed position when the spring bearing face is located in the second detent.

2. The system of claim 1, wherein, when an external threshold downward force is applied to the cupholder member while the cupholder member is in the deployed position, the spring bearing face of the cantilever spring is configured to move out of the second detent such that the resettable cupholder apparatus breaks over, wherein when in a broken over state, the resettable cupholder apparatus is resettable to the deployed position by moving the spring bearing face of the cantilever spring back to the second detent.

3. The system of claim 2, wherein, when no external forces are applied to the cupholder member, the resettable cupholder apparatus is configured to move to the stowed position if the spring bearing face is positioned such that the spring bearing face is applying force to an edge of of the first detent causing the spring bearing face to come to rest in the first detent.

4. The system of claim 3, further comprising a vehicle, wherein the resettable cupholder apparatus is mounted in the vehicle.

5. The system of claim 4, wherein the vehicle is an aircraft, wherein the aircraft comprises a seat having a seat back, wherein the resettable cupholder apparatus is mounted to the seat back.

6. The system of claim 3, wherein the cantilever spring is composed of spring steel.

7. The system of claim 6, wherein the cupholder member has a finger tab.

8. The system of claim 3, wherein the resettable cupholder apparatus is a top-hinged resettable cupholder apparatus, wherein the resettable cupholder apparatus further comprises:
    a mount member having a pivot arm cutout; and
    a curved pivot arm, wherein the curved pivot arm is connected to the cupholder member pivot portion with a first pin, wherein the curved pivot arm is connected to the mount member with a second pin, wherein the curved pivot arm extends through the pivot arm cutout, wherein the curved pivot arm allows the cupholder member pivot portion to extend away from the mount member as the resettable cupholder apparatus moves from the stowed position toward the deployed position.

9. The system of claim 8, wherein the cantilever spring is curved, wherein the first end of the cantilever spring is attached to the curved pivot arm, wherein the cantilever spring extends through the pivot arm cutout.

10. The system of claim 3, wherein the resettable cupholder apparatus is a top-hinged resettable cupholder apparatus, wherein the resettable cupholder apparatus further comprises:
    a mount member connected to the cupholder member pivot portion with a pin.

11. The system of claim 10, wherein the cantilever spring is curved, wherein the first end of the cantilever spring is attached to the mount member.

12. The system of claim 3, wherein the resettable cupholder apparatus is a bottom-hinged resettable cupholder apparatus, wherein the resettable cupholder apparatus further comprises:
    a mount member having a pivot arm cutout; and
    a curved pivot arm, wherein the curved pivot arm is connected to the cupholder member pivot portion with a first pin, wherein the curved pivot arm is connected to the mount member with a second pin, wherein the curved pivot arm extends through the pivot arm cutout, wherein the curved pivot arm is configured to move through the pivot arm cutout when the resettable cupholder apparatus moves past the deployed position in the broken over state.

13. The system of claim 12, wherein the cantilever spring is curved, wherein the first end of the cantilever spring is attached to the curved pivot arm, wherein the cantilever spring extends through the pivot arm cutout.

14. The system of claim 3, wherein the resettable cupholder apparatus is a bottom-hinged resettable cupholder apparatus, wherein the resettable cupholder apparatus further comprises:
    a mount member connected to the cupholder member pivot portion with a pin.

15. The system of claim 14, wherein the cantilever spring is curved, wherein the first end of the cantilever spring is attached to the mount member.

* * * * *